(12) United States Patent
Worters et al.

(10) Patent No.: US 11,985,611 B1
(45) Date of Patent: May 14, 2024

(54) SYNCHRONIZATION OF MULTI-USER UPLINK TRANSMISSIONS

(71) Applicant: Space Exploration Technologies Corp., Hawthorne, CA (US)

(72) Inventors: Peter J. Worters, San Carlos, CA (US); Martin S. McCormick, Studio City, CA (US); Matthew J. Monson, Bellevue, WA (US)

(73) Assignee: Space Exploration Technologies Corp., Hawthorne, CA (US)

( * ) Notice: Subject to any disclaimer, the term of this patent is extended or adjusted under 35 U.S.C. 154(b) by 0 days.

(21) Appl. No.: 17/339,890

(22) Filed: Jun. 4, 2021

Related U.S. Application Data

(60) Provisional application No. 63/035,159, filed on Jun. 5, 2020.

(51) Int. Cl.
*H04W 56/00* (2009.01)
*H04L 5/00* (2006.01)
*H04W 4/02* (2018.01)
*H04W 84/06* (2009.01)

(52) U.S. Cl.
CPC ... *H04W 56/0005* (2013.01); *H04W 56/0045* (2013.01); *H04W 56/0055* (2013.01); *H04W 56/006* (2013.01); *H04W 84/06* (2013.01); *H04L 5/0007* (2013.01); *H04W 4/027* (2013.01)

(58) Field of Classification Search
CPC .... H04W 4/00–08; H04W 4/20; H04L 5/0007
See application file for complete search history.

(56) References Cited

U.S. PATENT DOCUMENTS

| 2015/0063318 | A1* | 3/2015 | Merlin | H04L 1/1621 370/336 |
| 2015/0270890 | A1* | 9/2015 | Vasavada | H04B 7/195 370/326 |
| 2019/0033465 | A1* | 1/2019 | Kido | G01S 19/40 |
| 2019/0313357 | A1* | 10/2019 | Wang | H04W 56/0045 |
| 2021/0250885 | A1* | 8/2021 | Medles | H04L 27/0014 |
| 2022/0286198 | A1* | 9/2022 | Khan | H04W 56/0045 |

* cited by examiner

*Primary Examiner* — San Htun
(74) *Attorney, Agent, or Firm* — Polsinelli PC

(57) ABSTRACT

Systems, methods, and non-transitory media are provided for synchronization of multi-user uplink transmissions. An example method can include receiving, by a user terminal, a downlink radio frame transmitted by a satellite; determining, by the user terminal, a downlink propagation delay associated with the downlink radio frame and an uplink propagation delay associated with an uplink radio frame from the user terminal to the satellite; based on the downlink propagation delay and the uplink propagation delay, determining, by the user terminal, an uplink transmission delay indicating an amount of time to delay a transmission of the uplink radio frame to the satellite so the uplink radio frame is received at the satellite at a same target time as one or more additional uplink radio frames from one or more additional user terminals; and transmitting, by the user terminal, the uplink radio frame at a time corresponding to the uplink transmission delay.

17 Claims, 10 Drawing Sheets

SYNCHRONIZATION OF MULTI-USER UPLINK TRANSMISSIONS

CROSS-REFERENCE TO RELATED APPLICATIONS

This application claims priority to U.S. Provisional Patent Application No. 63/035,159, filed on Jun. 5, 2020, entitled "SYNCHRONIZATION OF MULTI-USER UPLINK TRANSMISSIONS", the contents of which are hereby incorporated by reference in their entirety and for all purposes.

TECHNICAL FIELD

The present disclosure generally relates to wireless communication systems and, more specifically, synchronization of uplink transmissions in wireless communications systems.

BACKGROUND

Wireless communication systems, such as cellular and satellite communication systems, can use orthogonal frequency-division multiple access (OFDMA) to modulate uplink transmissions from multiple devices, such as user terminals. With OFDMA, radio signals can be split into sub-signals and transmitted simultaneously or in parallel to a receiver. For example, devices can be assigned non-overlapping sets of contiguous time and frequency subcarriers (e.g., resource elements) that such devices can use to transmit wireless signals simultaneously. Since the signals are orthogonal, a wireless receiver can separate the signals from the different devices, allowing the receiver to receive and process multiple signals within a single radio frame. Thus, with OFDMA, a wireless communication system can receive transmissions from multiple devices within a single radio frame and thereby achieve high spectral efficiency.

To avoid interference from overlapping signals, transmissions in an OFDMA scheme can be allocated to non-overlapping time and frequency subcarriers. However, OFDMA schemes are sensitive to Doppler shift and time synchronization problems. For example, OFDMA schemes can be prone to frequency synchronization problems caused by motion (e.g., Doppler effects) and time synchronization problems caused by various delays and timing errors. In some cases, the relative motion and distance between a wireless receiver and the transmitting devices can vary widely, which can cause increasingly difficult time and frequency synchronization issues. Satellite-based communications can be particularly vulnerable to such synchronization problems as uplink transmissions from devices generally travel vast distances to satellite receivers moving at high velocities.

BRIEF DESCRIPTION OF THE DRAWINGS

In order to describe the manner in which the various advantages and features of the disclosure can be obtained, a more particular description of the principles described above will be rendered by reference to specific embodiments thereof, which are illustrated in the appended drawings. Understanding that these drawings depict only example embodiments of the disclosure and are not to be considered to limit its scope, the principles herein are described and explained with additional specificity and detail through the use of the drawings in which.

DETAILED DESCRIPTION

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

As previously explained, wireless communication systems can use OFDMA to split a radio signal into multiple sub-signals or sub-carriers to allow the wireless communication system to receive signals from different devices within a single radio frame. For example, devices can be assigned non-overlapping sets of contiguous time and frequency subcarriers that such devices can use to transmit signals simultaneously without interference. However, since the signals are orthogonal, OFDMA schemes are sensitive to Doppler shift and time synchronization problems. Such frequency and time synchronization problems can cause interference from overlapping signals.

Disclosed herein are systems, methods, and computer-readable media for synchronization of multi-user uplink transmissions. The disclosed technologies can provide accurate and efficient time and frequency synchronization for uplink transmissions from multiple devices. In some examples, the disclosed technologies can calculate various transmission delays that transmitting devices can use to time their uplink transmissions so they reach the destination receiver in a synchronized fashion (e.g., synchronized in time and frequency) and thereby avoid interference from overlapping signals. The disclosed technologies can account for the relative motion and distances between communicating devices to provide accurate time synchronization information. The disclosed technologies can accurately synchronize wireless transmissions over long distances between devices moving at high relative velocities.

Figure 7:
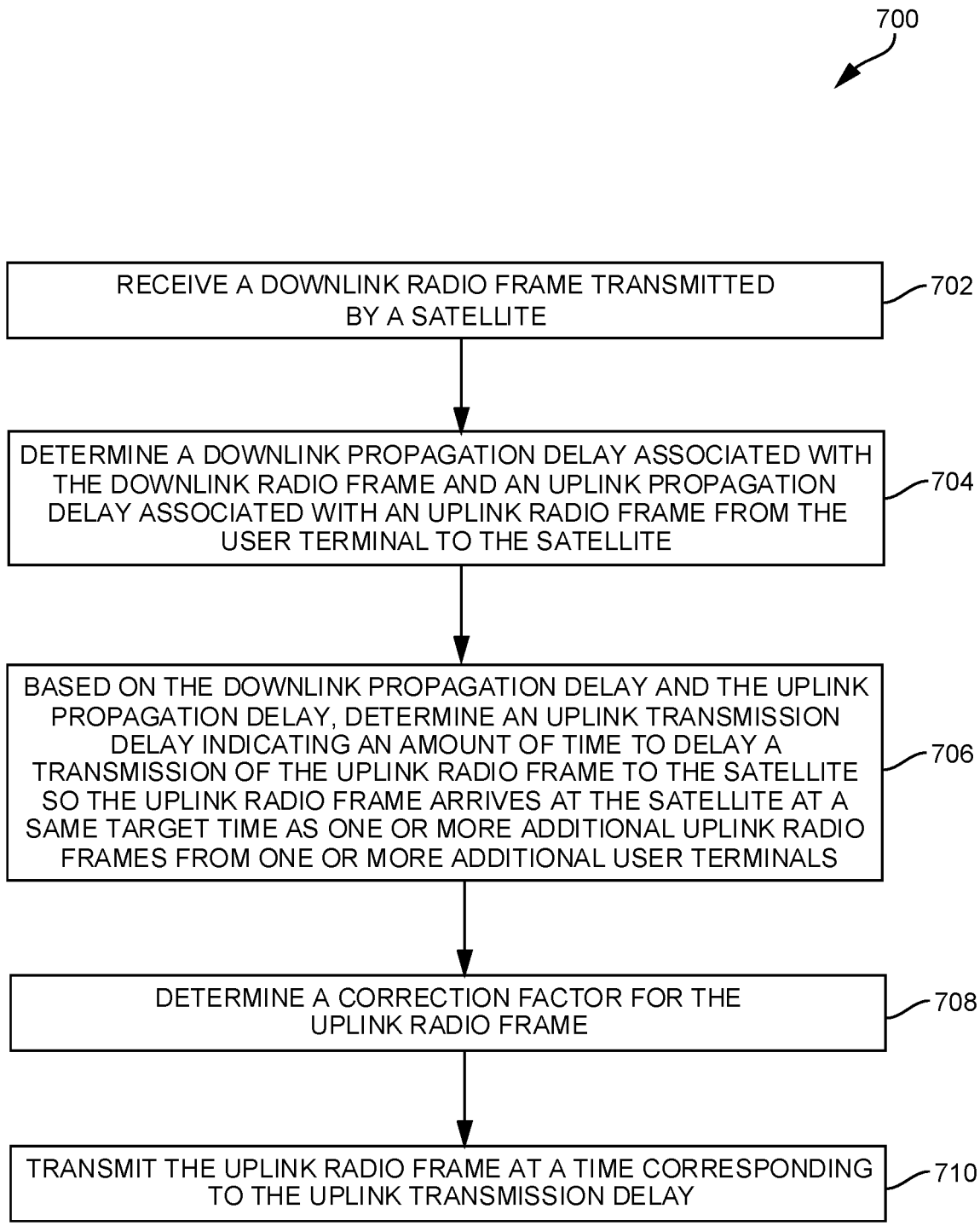
FIG. 7 is a flowchart illustrating an example method for synchronizing multi-user uplink transmissions, in accordance with some examples of the present disclosure.
Figure 8:
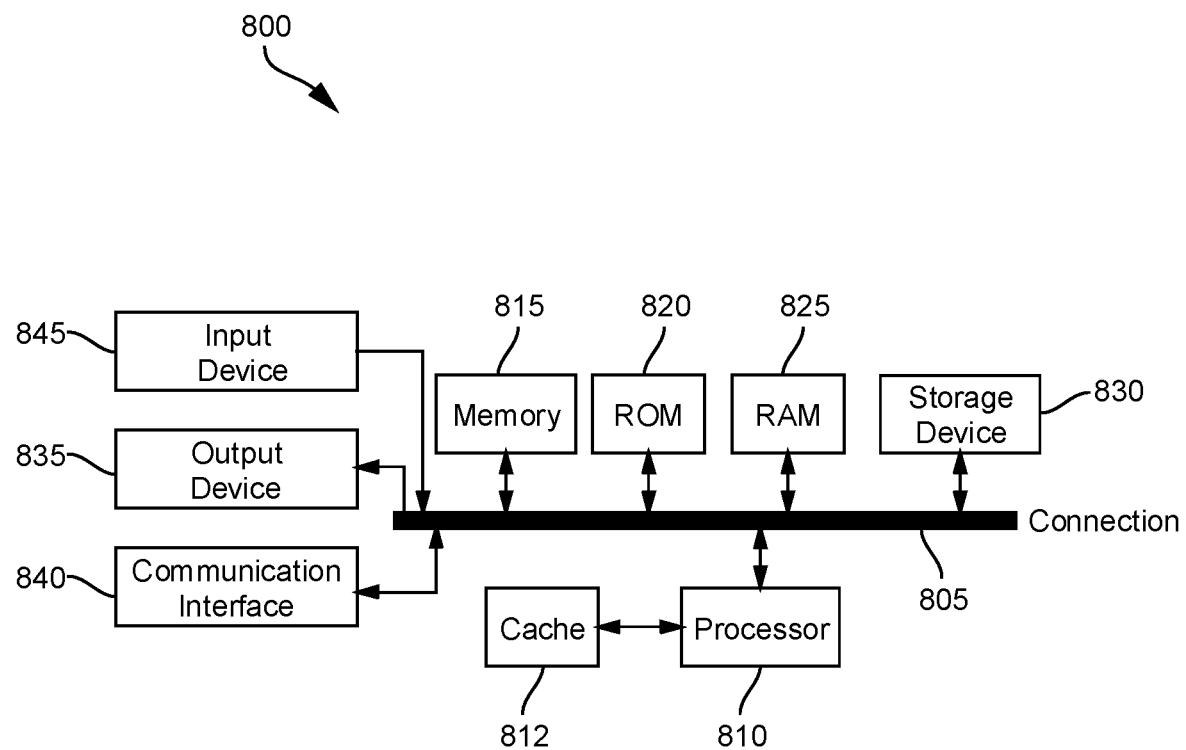
FIG. 8 illustrates an example computing device architecture, in accordance with some examples of the present disclosure.

The present technologies will be described in the following disclosure as follows. The discussion begins with a description of example systems and technologies for wireless communications and synchronization of multi-user uplink transmissions, as illustrated in FIGS. 1A through 6. A description of an example method for synchronizing multi-user uplink transmissions, as illustrated in FIG. 7, will then follow. The discussion concludes with a description of an example computing device architecture including example hardware components suitable for performing multi-user uplink time synchronization, as illustrated in FIG. 8. The disclosure now turns to FIG. 1A.

Figure 1A:
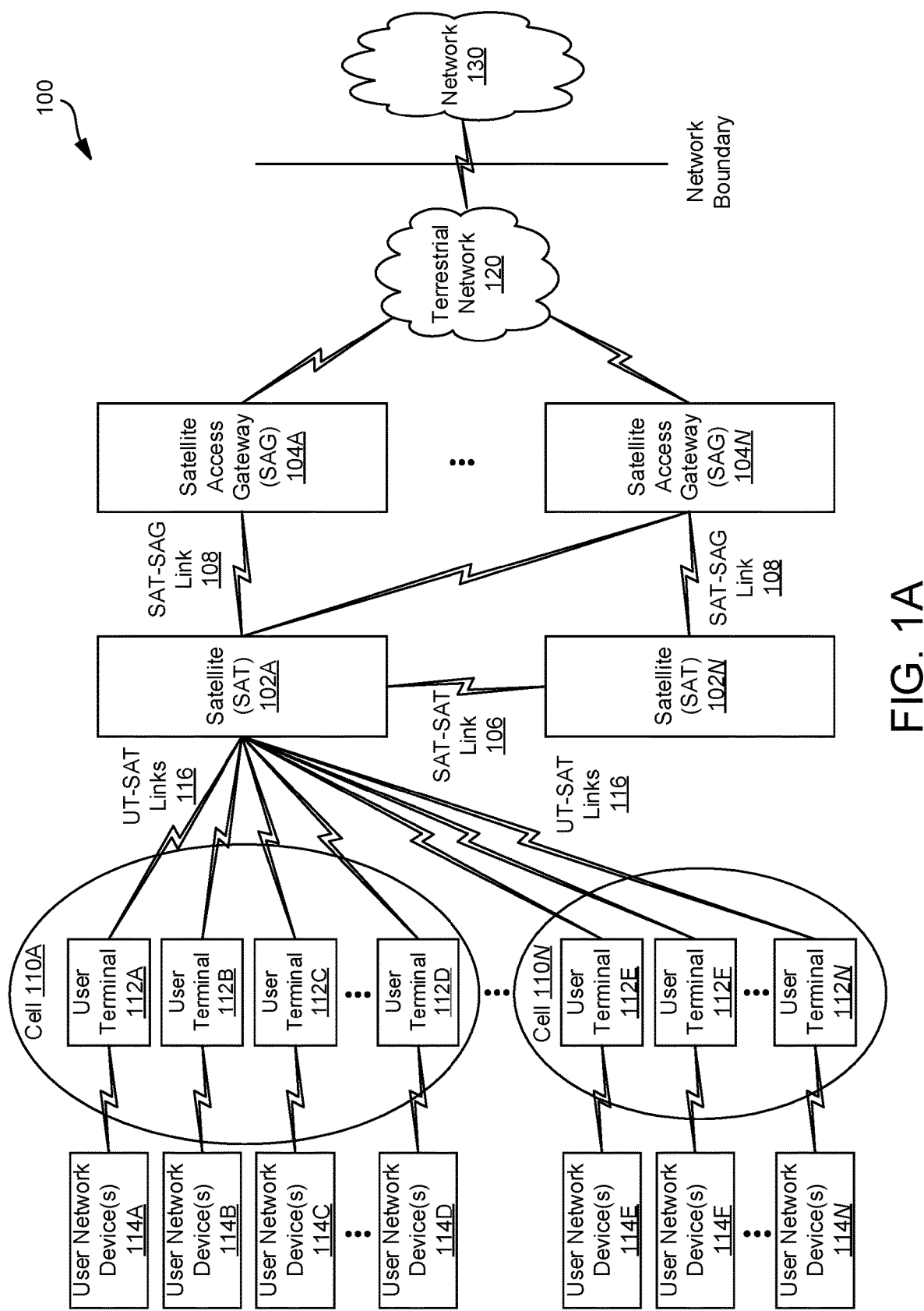
FIG. 1A is a simplified diagram illustrating an example wireless communication system, in accordance with some examples of the present disclosure.

FIG. 1A is a block diagram illustrating an example wireless communication system 100, in accordance with some examples of the present disclosure. In this example, the wireless communication system 100 is a satellite-based communication system and includes one or more satellites (SATs) 102A-102N (collectively "102"), one or more satellite access gateways (SAGs) 104A-104N (collectively "104"), user terminals (UTs) 112A-112N (collectively "112"), user network devices 114A-114N (collectively "114"), and a terrestrial network 120 in communication with a network 130. In some examples, the network 130 can include and/or represent the Internet. However, in other examples, the network 130 can include and/or represent any other network(s).

The SATs 102 can include orbital communications satellites capable of communicating with other wireless devices or networks (e.g., 104, 112, 114, 120, 130) via radio telecommunications signals. The SATs 102 can provide communication channels, such as radio frequency (RF) links (e.g., 106, 108, 116), between the SATs 102 and other wireless devices located at different locations on Earth and/or in orbit. In some examples, the SATs 102 can establish communication channels for Internet, radio, television, telephone, radio, military, and/or other applications.

The user terminals 112 can include any electronic devices and/or physical equipment that support RF communications to and from the SATs 102. Similarly, the SAGs 104 can include gateways or earth stations that support RF communications to and from the SATs 102. The user terminals 112 and the SAGs 104 can include antennas for wirelessly communicating with the SATs 102. The user terminals 112 and the SAGs 104 can also include satellite modems for modulating and demodulating radio waves used to communicate with the SATs 102. In some examples, the user terminals 112 and/or the SAGs 104 can include one or more server computers, routers, ground receivers, earth stations, user equipment, antenna systems, communication nodes, base stations, access points, and/or any other suitable device or equipment. In some cases, the user terminals 112 and/or the SAGs 104 can perform phased-array beam-forming and digital-processing to support highly directive, steered antenna beams that track the SATs 102. Moreover, the user terminals 112 and/or the SAGs 104 can use one or more frequency bands to communicate with the SATs 102, such as the Ku and/or Ka frequency bands.

The user terminals 112 can be used to connect the user network devices 114 to the SATs 102 and ultimately the Internet (e.g., network 130). The SAGs 104 can be used to connect the terrestrial network 120 and the Internet (e.g., network 130) to the SATs 102. For example, the SAGs 104 can relay communications from the terrestrial network 120 and/or the network 130 to the SATs 102, and communications from the SATs 102 (e.g., communications originating from the user network devices 114, the user terminals 112, or the SATs 102) to the terrestrial network 120 and/or the network 130.

The user network devices 114 can include any electronic devices with networking capabilities and/or any combination of electronic devices such as a computer network. For example, the user network devices 114 can include routers, network modems, switches, access points, laptop computers, servers, tablet computers, set-top boxes, Internet-of-Things (IoT) devices, smart wearable devices (e.g., head-mounted displays (HMDs), smart watches, etc.), gaming consoles, smart televisions, media streaming devices, autonomous vehicles, robotic devices, user networks, etc. The terrestrial network 120 can include one or more networks and/or data centers. For example, the terrestrial network 120 can include a public cloud, a private cloud, a hybrid cloud, an enterprise network, a service provider network, an on-premises network, and/or any other network.

In some cases, the SATs 102 can establish communication links between the SATs 102 and the user terminals 112. For example, SAT 102A can establish communication links 116 between the SAT 102A and the user terminals 112A-D and/or 112E-N. The communication links 116 can provide communication channels between the SAT 102A and the user terminals 112A-D and/or 112E-N. In some examples, the user terminals 112 can be interconnected (e.g., via wired and/or wireless connections) with the user network devices 114. Thus, the communication links between the SATs 102 and the user terminals 112 can enable communications between the user network devices 114 and the SATs 102. In some examples, each of the SATs 102A-N can serve user terminals 112 distributed across and/or located within one or more cells 110A-110N (collectively "110"). The cells 110 can represent geographic areas served and/or covered by the SATs 102. For example, each cell can represent an area corresponding to the satellite footprint of radio beams propagated by a SAT. In some cases, a SAT can cover a single cell. In other cases, a SAT can cover multiple cells. In some examples, a plurality of SATs 102 can be in operation simultaneously at any point in time (also referred to as a satellite constellation). Moreover, different SATs can serve different cells and sets of user terminals.

The SATs 102 can also establish communication links 106 with each other to support inter-satellite communications. Moreover, the SATs 102 can establish communication links 108 with the SAGs 104. In some cases, the communication links between the SATs 102 and the user terminals 112 and the communication links between the SATs 102 and the SAGs 104 can allow the SAGs 104 and the user terminals 112 to establish a communication channel between the user network devices 114, the terrestrial network 120 and ultimately the Internet (e.g., network 130). For example, the user terminals 112A-D and/or 112E-N can connect the user network devices 114A-D and/or 114E-N to the SAT 102A through the communication links 116 between the SAT 102A and the user terminals 112A-D and/or 112E-N. The SAG 104A can connect the SAT 102A to the terrestrial network 120, which can connect the SAGs 104A-N to the network 130. Thus, the communication links 108 and 116, the SAT 102A, the SAG 104A, the user terminals 112A-D and/or 112E-N and the terrestrial network 120 can allow the user network devices 114A-D and/or 114E-N to connect to the Internet (e.g., network 130).

In some examples, a user can initiate an Internet connection and/or communication through a user network device from the user network devices 114. The user network device can have a network connection to a user terminal from the user terminals 112, which it can use to establish an uplink (UL) pathway to the network 130. The user terminal can wirelessly communicate with a particular SAT from the SATs 102, and the particular SAT can wirelessly communicate with a particular SAG from the SAGs 104. The particular SAG can be in communication (e.g., wired and/or wireless) with the terrestrial network 120 and, by extension, the network 130. Thus, the particular SAG can enable the Internet connection and/or communication from the user network device to the terrestrial network 120 and, by extension, the network 130.

In some cases, the particular SAT and SAG can be selected based on signal strength, line-of-sight, and the like. If a SAG is not immediately available to receive communications from the particular SAT, the particular SAG can be configured to communicate with another SAT. The second SAT can in turn continue the communication pathway to a particular SAG. Once data from the network 130 is obtained for the user network device, the communication pathway can be reversed using the same or different SAT and/or SAG as used in the UL pathway.

Figure 2:
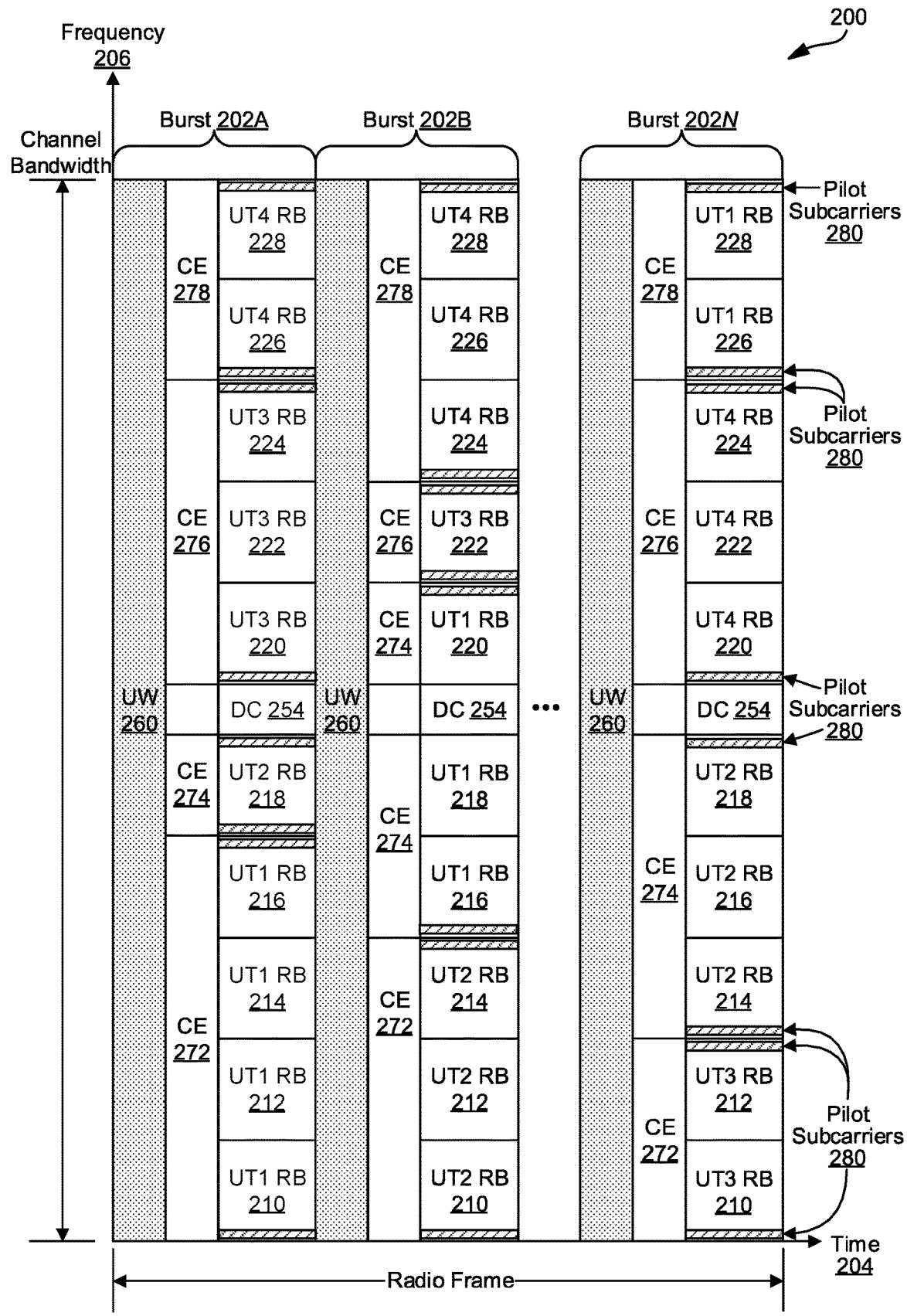
FIG. 2 illustrates an example configuration of a multi-user (MU) uplink (UL) radio frame, in accordance with some examples of the present disclosure.
Figure 3:
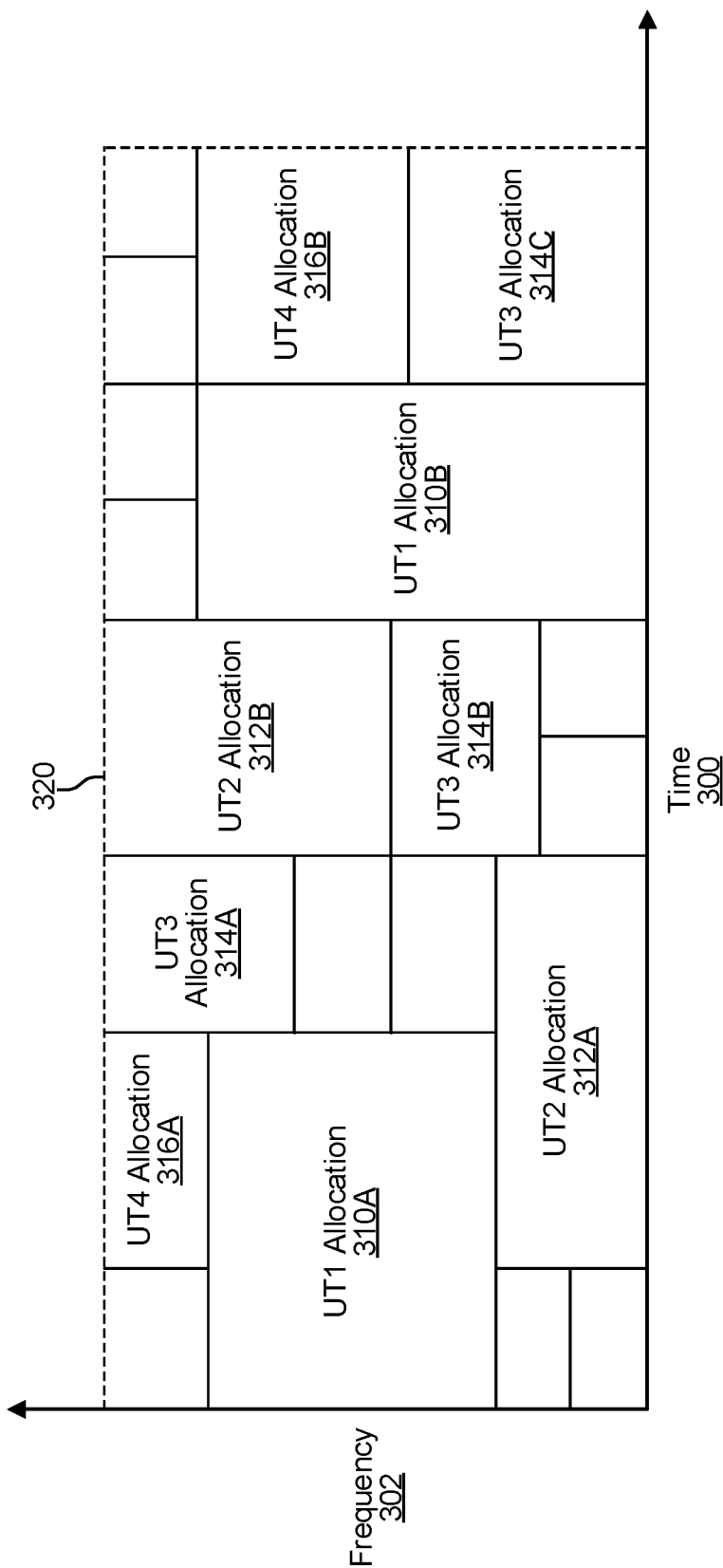
FIG. 3 is a diagram illustrating example orthogonal frequency-division multiple access (OFDMA) uplink transmissions from multiple user terminals synchronized along a time domain and a frequency domain, in accordance with some examples of the present disclosure.

In some examples, the communication links (e.g., 106, 108, and 116) in the wireless communication system 100 can operate using orthogonal frequency division multiple access (OFDMA) via both time domain and frequency domain multiplexing. OFDMA, also known as multicarrier modulation, transmits data over a bank of orthogonal subcarriers harmonically related by the fundamental carrier frequency. An example configuration of an OFDM radio frame structure that can be used for communications in the wireless communication system 100 is shown in FIG. 2 and described below with respect to FIG. 2, and example radio frame resource allocations using OFDMA are shown in FIG. 3 and described below with respect to FIG. 3. Moreover, in some cases, for computational efficiency, fast Fourier transforms (FFT) can be used for modulation and demodulation.

While the wireless communication system 100 is shown to include certain elements and components, one of ordinary skill in the art will appreciate that the wireless communication system 100 can include more or fewer elements and components than those shown in FIG. 1A. For example, the wireless communication system 100 can include, in some instances, networks, cellular towers, communication hops or pathways, network equipment, and/or other electronic devices that are not shown in FIG. 1A.

Figure 1B:
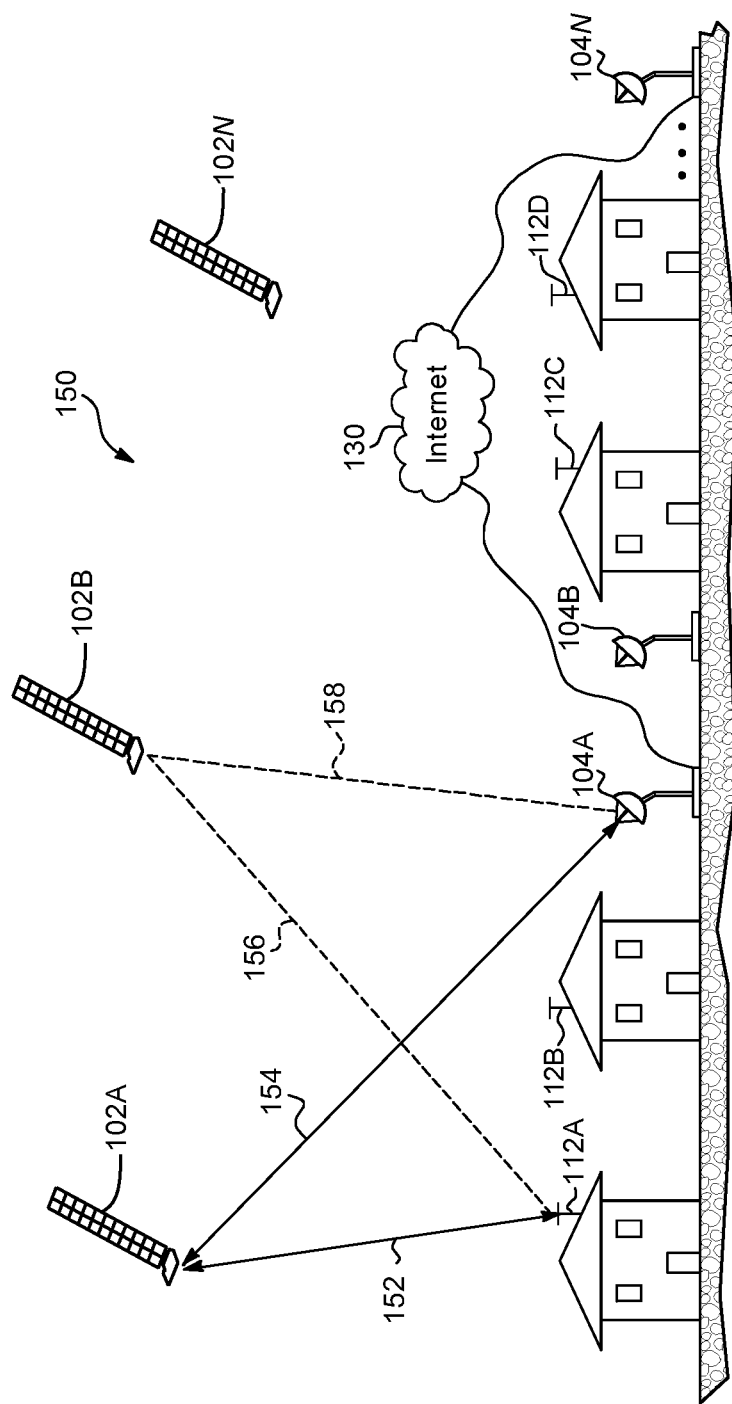
FIG. 1B is a simplified diagram illustrating an example of a satellite-based communications environment, in accordance with some examples of the present disclosure.

FIG. 1B is a diagram illustrating an example of a satellite-based communications environment 150, in accordance with various aspects of the present disclosure. The satellite-based communications environment 150 can include a plurality of SATs 102A-N orbiting Earth in, for example and without limitation, a non-geostationary orbit (NGO) constellation. In this example, three SATs (e.g., SAT 102A, 102B, and 102/V) are shown for illustrative purposes. However, one of ordinary skill in the art will recognize that other examples can include more or less SATs than those shown in FIG. 1B.

The satellite-based communications environment 150 includes ground or Earth-based equipment configured to communicate with the SATs 102A-N. In some examples, such equipment can include user terminals (UTs) 112A-N and SAGs 104A-N. Each of the UTs 112A-N can be associated with a particular user. The UTs 112A-N can be configured to serve as a conduit between particular user networks and/or devices (e.g., 114A-N) and at least one of the SATs 102A-N in communication range of the UTs 112A-N, such that the particular user networks and/or device can have access to a network, such as the network 130. Each of the UTs 112A-N is particularly positioned in proximity to an associated user network and/or device. For example, each of the UTs 112A-N can be located on a respective user's building's roof, a yard of the user's building, etc. A variety of other locations are also contemplated for the UTs 112A-N.

At any given time, a particular SAT (102A, 102B, 102/V) can be in communication with a given UT from the UTs 112A-N to facilitate a link to the network 130. For instance, a user device in proximity to UT 112A (e.g., and connected together via a wireless connection) requests to access the network 130 (e.g., request a web page). UT 112A can establish a communication link 152 to the SAT 102A and transmit the data request. SAT 102A, in response, can establish a communication link 154 with an SAG 104A to relay the data request. The SAG 104A can have a connection (e.g., wired or wireless) to the network 130.

The data associated with the request (e.g., the requested web page) can be returned in the reverse path, from the SAG 104A, communication link 154, SAT 102A, communication link 152, and UT 112A, to the originating user device. If SAT 102A moves out of position relative to UT 112A before the requested data can be provided to the UT 112A (or otherwise becomes unavailable), then SAG 104A can establish a communication pathway 156, 158 with a different SAT, such as SAT 102B, to provide the requested data.

In some aspects, one or more of the SAGs 104A-N can include repeaters that lack a wired connection to the network 130. A repeater can be configured to relay communications to and/or from a SAT that is a different SAT from the one that directly communicates with a UT or gateway. A repeater can be configured to be part of the communication pathway between a UT and gateway. A repeater may be accessed in cases where a SAT does not have access to a gateway, and thus has to send its communication to another SAT that has access to a gateway via the repeater. Repeaters can be located terrestrially, on water (e.g., on ships or buoys), in airspace below satellite altitudes (e.g., on an airplane or balloon), and/or other Earth-based locations. Accordingly, the SAGs 104A-N can also be referred to as Earth-based network nodes, Earth-based communication nodes, and/or the like. In some aspects, transmitter and receiver systems can be included in each UT, SAT, and gateway of the satellite-based communications environment 150.

While the satellite-based communications environment 150 is shown to include certain elements and components, one of ordinary skill will appreciate that the satellite-based communications environment 150 can include more or fewer elements and components than those shown in FIG. 1B. For example, the satellite-based communications environment 150 can include, in some instances, networks, cellular towers, communication hops or pathways, network equipment, and/or other electronic devices that are not shown in FIG. 1B.

FIG. 2 illustrates an example configuration of a multi-user (MU) uplink (UL) radio frame 200. In this example, the MU uplink radio frame 200 includes an example OFDM signal structure, symbols and characteristics along a time domain 204 and a frequency domain 206. In some examples, the MU uplink radio frame 200 can include a superframe (e.g., a frame including several subframes) having a length corresponding to a certain interval of time, synchronization period and/or time slots. In some examples, resources associated with the MU uplink radio frame 200 can be allocated to multiple user terminals as shown in FIG. 3.

The MU uplink radio frame 200 includes multiple bursts 202A through 202N, and each burst is allocated to different user terminals (e.g., UT 1, UT 2, UT 3, UT 4). Each of the user terminals is allocated contiguous resource blocks (RBs) and channel estimation (CE) symbols immediately adjacent to the allocated RBs. The RBs and CE symbols are allocated to the user terminals along the time domain 204 and the frequency domain 206.

For example, in burst 202A, RBs 210-216 and CE 272 are allocated to UT 1 (e.g., UT 112A), RB 218 and CE 274 are allocated to UT 2 (e.g., UT 112B), RBs 220-224 and CE 276 are allocated to UT 3 (e.g., UT 112C), and RBs 226-228 and CE 278 are allocated to UT 4 (e.g., UT 112D). In burst 202B, RBs 210-214 and CE 272 are allocated to UT 2, RBs 216-220 and CE 274 are allocated to UT 1, RB 222 and CE 276 are allocated to UT 3, and RBs 224-228 and CE 278 are allocated to UT 4. In burst 202N, RBs 210-212 and CE 272 are allocated to UT 3, RB 214-218 and CE 274 are allocated to UT 2, RBs 220-224 and CE 276 are allocated to UT 4, and RBs 226-228 and CE 278 are allocated to UT 1. As shown in FIG. 2, the allocations between user terminals from burst to burst can be flexible, which can allow for the allocations from burst to burst to vary or remain the same.

In some cases, the number of RBs between user terminals can vary depending on the payload sizes for the different user terminals. Moreover, in some cases, a burst (e.g., 202A, 202B, 202/V) can include a different total number of RBs than those shown in FIG. 2. In some cases, if fewer than four user terminals is supported in a given burst, at least some RBs and adjacent CE symbol sections can be empty or otherwise denoted as empty or null.

Each of the bursts 202A-202N includes preamble and payload symbols. The preamble portion or block of a burst includes a unique word (UW) symbol 260 and a CE portion including CE symbols 272-278. The UW symbol 260 can be used for burst detection, symbol alignment, carrier frequency offset estimation, etc. The CE symbols 272-278 can provide a preview of channel characteristics for use in channel estimation and equalization. The payload symbols of a burst (also referred to as data symbols) can be located within a payload portion/block of the burst corresponding to the RBs 210-228.

The CE portion/block containing the CE symbols 272-278 of a burst can be located between the unique word portion/block (e.g., the UW symbol 260) and the payload portion/block (e.g., RBs 210-228) along the time domain 204. In other words, in the time domain 204, the unique word symbol 260 occurs first, followed by the CE symbols 272-278, and then followed by the RBs 210-228.

An OFDMA signal allows certain subcarriers to be inactivated, and a configurable number of subcarriers can be disabled in order to avoid the region of spectrum around DC (also referred to as the DC, center, null, or zero subcarrier region) and/or disproportionately higher interference. Accordingly, in some examples, the MU uplink radio frame 200 can include an unused DC subcarrier 254, which can coincide with the carrier center frequency.

Pilot subcarriers 280 can be used to provide and track amplitude, timing, and phase changes throughout a burst. Each of the bursts 202A-N can have pilot subcarriers 280 defined for the burst. The pilot subcarriers 280 can each be offset from the band edges by a specified number of subcarriers. FIG. 2 shows pilot subcarriers 280 at the edges of the first and last RB allocated to each user terminal in the frequency domain. In some examples, the size of the pilot sub-bands and the offset from the band edges can be configurable. In some examples, for wide channel bandwidths, the information provided within pilot subcarriers for a given radio frame can be the same or can differ from each other.

FIG. 3 is a diagram illustrating an example allocation of resources to user terminals (e.g., UT1, UT2, UT3, UT4) for OFDMA uplink transmissions. The resource blocks can be allocated to the user terminals along a time domain 300 and a frequency domain 302. In this example, UT allocations 310A-B, 312A-B, 314A-C, 316A-B represent sets of contiguous time and frequency subcarriers (e.g., resource elements) assigned to the user terminals UT1 (e.g., user terminal 112A), UT2 (e.g., user terminal 112B), UT3 (e.g., user terminal 112C), and UT4 (e.g., user terminal 112D), which can allow the user terminals 112A-D (UT1-4) to transmit signals to the SAT (e.g., SAT 102A) in parallel without interference. The UT allocations 310A-B, 312A-B, 314A-C, 316A-B can include RBs (e.g., 210, 212, 214, 216, 218, 220, 222, 224, 226, 228) associated with a radio frame (e.g., 200), with each UT allocation including a number of respective RBs allocated to a UT associated with that UT allocation.

The UT allocations 310A-B, 312A-B, 314A-C, 316A-B in this example are shown within a grid 320 including allocated and unallocated blocks or slots along the time domain 300 and the frequency domain 302. Each of the UT allocations 310A-B, 312A-B, 314A-C, 316A-B can include specific contiguous, non-overlapping blocks or slots, which can correspond to a number of time and frequency subcarriers along the time domain 300 and the frequency domain 302, which allows the user terminals to avoid or limit interference. Thus, based on the UT allocations 310A-B, 312A-B, 314A-C, 316A-B, uplink transmissions from the user terminals (UT1-4) can synchronized in time and frequency within the grid 320.

The uplink transmissions from the user terminals can be modulated using OFDMA, with each UT being assigned non-overlapping sets of contiguous time and frequency subcarriers (e.g., UT allocations 310A-B, 312A-B, 314A-C, 316A-B) to allow the UTs 1-4 (e.g., UTs 112A-D) to transmit together without interference. The uplink transmissions from the UTs 1-4 can then be separated by the receiver (e.g., SAT 102A) because the uplink transmissions are orthogonal and synchronized across the time domain 300 and the frequency domain 302.

For example, as shown by the UT allocations 310A-B, 312A-B, 314A-C, 316A-B in FIG. 3, the UTs 1-4 all have non-overlapping alignments in time and frequency along the time domain 300 and the frequency domain 302 for their respective uplink transmissions. This enables the multiple user terminals (UTs 1-4) to transmit in parallel or simultaneously without (or with limited) interference from the multiple transmissions.

In some cases, the different propagation delays of downlink and uplink transmissions associated with the user terminals (UTs 1-4), which can be caused by the respective distances between the user terminals (UTs 1-4) and the receiver (e.g., SAT 102A) as well as the effects of motion (e.g., Doppler shift) caused by the motion of the receiver relative to the user terminals, can cause synchronization problems such as misalignment or overlapping transmissions. For example, downlink and/or uplink propagation delays associated with the user terminals can cause misalignment of the UT allocations 310A-B, 312A-B, 314A-C, 316A-B. Such synchronization problems are exacerbated and/or particularly difficult in the context of satellite communications where the transmissions between a satellite and user terminals generally travel very far distances, which can further increase propagation delays, and where the receiving satellite moves at an extremely high velocity which can cause significant Doppler effects.

Thus, in some examples, to increase synchronization accuracy and avoid such synchronization problems, the user terminals and/or the receiving satellite can calculate transmission delays that account for the different propagation delays caused by the respective distances between the user terminals (UT1 through UT4) and the receiving satellite (e.g., SAT 102A) as well as the effects of motion (e.g., Doppler shift) caused by the relative motion of the receiving satellite. The user terminals can use such calculated transmission delays to determine when to transmit uplink transmissions to the satellite so they are properly aligned based on the UT allocations 310A-B, 312A-B, 314A-C, 316A-B and accurately synchronized in time and frequency when received by the receiving satellite.

For example, when the user terminals receive a downlink transmission, the user terminals can wait a respective amount of time based on their calculated transmission delays before transmitting their respective uplink transmissions. This can prevent their uplink transmissions from overlapping in time and frequency, which can allow the receiving satellite to separate the uplink transmissions without interference. Moreover, such synchronization can allow more efficient use of a transmission channel as it enables the multiple user terminals to be allocated different time slots without (or with minimal) gaps between them.

In some cases, Doppler shift and/or time misalignments of OFDMA uplink transmissions can cause compression or expansion of their associated UT allocations 310A-B, 312A-B, 314A-C, 316A-B in the grid 320. The compression or expansion of the UT allocations 310A-B, 312A-B, 314A-C, 316A-B can cause a sample-frequency offset (SFO) at the receiving device, such as the SAT, and can result in inter-symbol-interference (ISI) and/or inter-carrier-interference (ICI). Accordingly, in some cases, a resampler, such as resampler 662 shown in FIG. 6B, can apply a correction factor to the OFDMA uplink transmissions to correct timing errors and frequency shifts in the OFDMA uplink transmissions and avoid or reduce SFO, ISI, and ICI. In some examples, a resampler at the transmitter side and/or the receiver side can calculate and apply a correction factor(s) as further described below with respect to FIG. 4.

For example, a UT can apply a downlink correction factor to downlink transmissions from the SAT in order to post-compensate for frequency shift and timing offset associated with the downlink radio frame, and can apply an uplink correction factor to an uplink radio frame to the SAT to pre-compensate for timing offset and frequency shift in the uplink radio frame. Similarly, the SAT can apply a correction factor when receiving uplink transmissions from the user terminals to post-compensate for timing offsets and frequency shifts in the uplink transmissions, and can apply a correction factor when transmitting a downlink radio frame to pre-compensate for timing offset. The correction factors can allow any timing offset and frequency shifts in uplink transmissions from the user terminals to be corrected so the uplink transmissions are properly aligned in the grid 320 within contiguous, non-overlapping blocks or slots.

Figure 4:
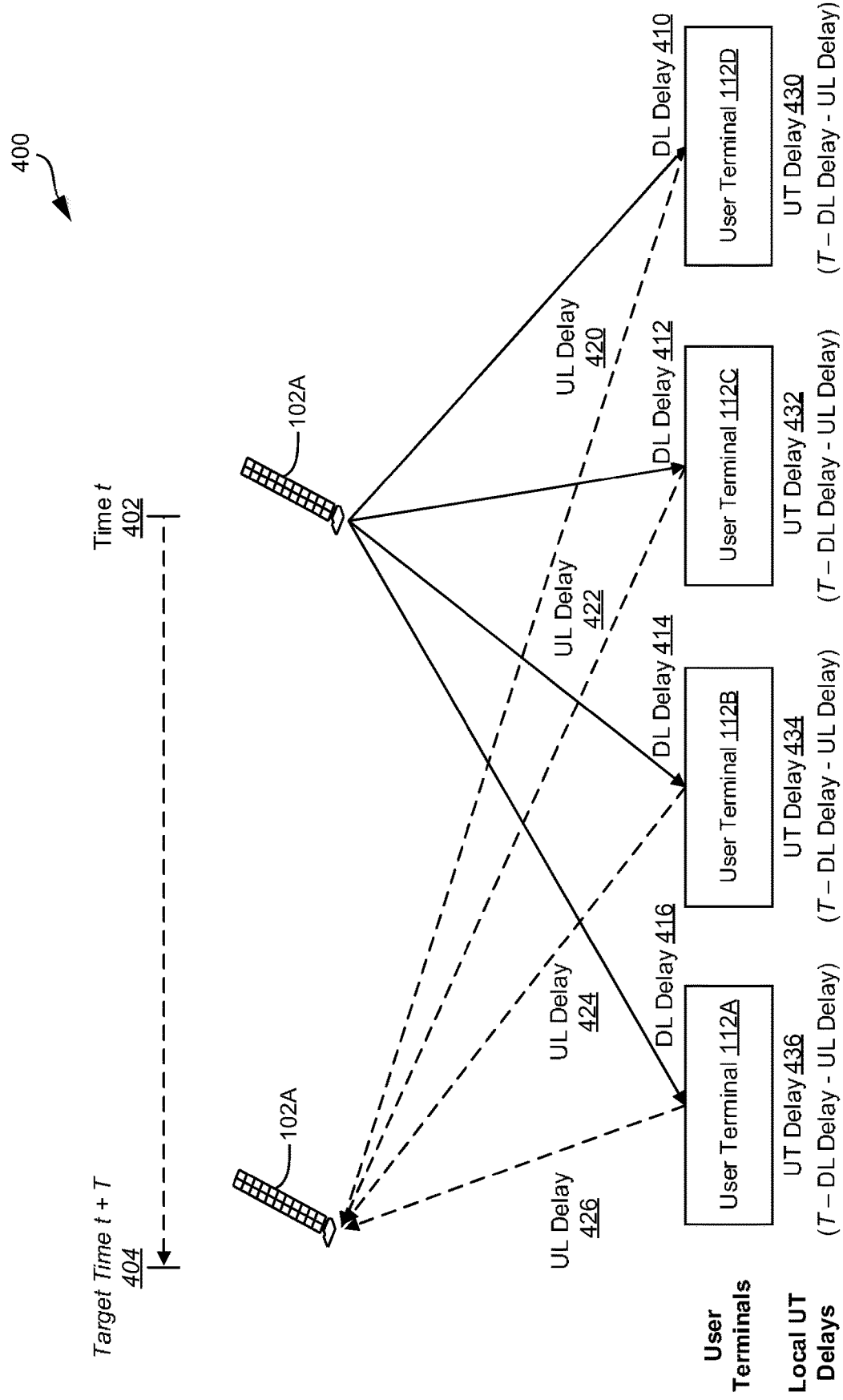
FIG. 4 is a diagram illustrating an example system for synchronizing uplink radio frames transmitted by multiple user terminals to a receiving satellite, in accordance with some examples of the present disclosure.

FIG. 4 is a diagram illustrating an example system 400 for synchronizing uplink radio frames transmitted by multiple user terminals to a receiving satellite. The uplink radio frames from the multiple user terminals can be synchronized to ensure the uplink radio frames are accurately aligned in time when received at the receiving satellite in order to avoid or limit ISI and/or ICI. In some examples, the uplink radio frames transmitted by the multiple user terminals can be synchronized in time by calculating respective uplink transmission delays or times for the multiple user terminals, which the user terminals can use to determine when to send their uplink radio frames so they arrive at the receiving satellite at the same time or substantially the same time (e.g., within a permissible or tolerable time misalignment amount).

To calculate the uplink transmission delays, SAT 102A can calculate a target time (7) 404 when the uplink radio frames from the UTs 112A-D should arrive at the SAT 102A. The SAT 102A can calculate the target time 404 relative to a reference time (t) 402. The reference time 402 can be based on, for example, a downlink transmission time (e.g., a time when the SAT 102A sends or sent a downlink transmission to the UTs 112A-D), an uplink receive time (e.g., a time when the SAT 102A receives or received an uplink radio frame associated with the UTs 112A-D), a current time at the SAT 102A, or any other time. In the example shown in FIG. 4, the reference time 402 corresponds to the time of a downlink transmission from the SAT 102A to the UTs 112A-D.

In some cases, the target time 404 can be a target delay from the reference time 402 to when the SAT 102A should receive (or expects to receive) uplink radio frames from the UTs 112A-D. For example, in some cases, the SAT 102A can estimate a maximum delay and/or a round-trip time for communications between the SAT 102A and the UTs 112A-D (e.g., the amount of time estimated to take for uplink radio frames from the UTs 112A-D to reach the SAT 102A after the SAT 102A sends a downlink transmission to the UTs 112A-D), and determine the target time 404 based on the reference time 402 and the round-trip time. To illustrate, in some cases, the SAT 102A can calculate, a maximum downlink propagation delay (e.g., the maximum amount of time estimated to take a downlink transmission from the SAT 102A to reach each UT 112A-D) and a maximum uplink propagation delay (e.g., the maximum amount of time estimated to take uplink radio frames from the UTs 112A-D to reach the SAT 102A). The SAT 102A can then calculate the target delay used to determine the target time 404 based on the maximum downlink and uplink propagation delays (e.g., the highest downlink propagation delay plus the highest downlink propagation delay). In some cases, the target delay can be calculated based on the estimated location of the SAT 102A at the target time and/or after the target delay.

In some examples, the downlink and uplink propagation delay calculations can account for the relative motion and distances of the SAT 102A and the UTs 112A-D. Moreover, in some cases, the target delay calculated can also account for other delays such as processing delays at the UTs 112A-D, periodic self-calibration requirements of the UT and/or certain errors such as, for example, position errors, velocity calculation errors, relativistic effects, time or clock errors, additional propagation delay factors, error drift (e.g., timing error drift, delay error drift, etc.), frequency offsets, and/or any other potential errors. For example, the SAT 102A can calculate processing delays at the UTs 112A-D and/or one or more other potential delays and/or errors, and add the delay(s) caused by such factors to the downlink and uplink propagation delays to determine a total delay for calculating the target time 404.

In some cases, the target delay used to calculate the target time 404 can remain constant and/or can persist for a period of time and/or a number of transmissions. In other cases, the target delay can be adjusted or updated periodically. For example, the SAT 102A can periodically adjust the target delay to satisfy half-duplex constraints at the UTs 112A-D.

After calculating the target time 404, the SAT 102A can provide the target time 404 to the UTs 112A-D through a downlink transmission to the UTs 112A-D. The UTs 112A-D can use the target time 404 to calculate respective, local uplink delays used by each of the UTs 112A-D to determine when to transmit uplink radio frames to the SAT 102A, as further described below. In some examples, the SAT 102A can specify the target time 404 in an UL-MAP (uplink map) control message included in a portion of a downlink radio frame. The UL-MAP can define the uplink access for the UTs 112A-D during a scheduling interval. In other words, the UL-MAP can allocate access or time slots to the uplink channel for uplink transmissions from the UTs 112A-D. Thus, in some cases, the UL-MAP can include the target time 404 calculated by the SAT 102A.

Upon receiving a downlink radio frame from the SAT 102A, each of the UTs 112A-D can calculate a local uplink delay (UT delay 430, 432, 434, 436) that each of the UTs 112A-D can use to determine when to transmit an uplink radio frame(s) to the SAT 102A so that the uplink radio frames from the UTs 112A-D arrive at the SAT 102A at the target time 404, in a synchronized manner (e.g., synchronized in time). The UTs 112A-D can calculate UT delays 430-436 which provide respective delay offsets relative to the times that the UTs 112A-D received the downlink radio frame from the SAT 102A or the times that the SAT 102A transmitted the downlink radio frame. The UTs 112A-D can delay their uplink radio frame transmissions to the SAT 102A (e.g., relative to the times they received the downlink radio frame from the SAT 102A or the time that the SAT 102A transmitted the downlink radio frame) by a respective amount of time corresponding to the UT delays 430-436 to ensure their uplink radio frames arrive at the SAT 102A at the target time 404, in a synchronized manner.

The UT delays 430-436 corresponding to the UTs 112A-D can be based on respective downlink (DL) delays 410-416 representing the respective propagation delays of the downlink radio frame from the SAT 102A to the UTs 112A-D, as well as respective uplink (UL) delays 420-426 representing propagation delays of the uplink radio frames from the UTs 112A-D to the SAT 102A. For example, each of the UT delays 430-436 can be calculated by subtracting, from the target time 404, a DL delay (e.g., 410, 412, 414, or 416) and an UL delay (e.g., 420, 422, 424, or 426) associated with a corresponding UT.

In some examples, the DL delays 410-416 can be calculated relative to the time that the downlink radio frame was sent by the SAT 102A rather than relative to the time of receipt at the UTs 112A-D to avoid misalignments with the target time 404 when calculating the UT delays 430-436. For example, to calculate the DL delays 410-416, the UTs 112A-D can subtract their respective estimated downlink propagation delays from their respective times of downlink transmission or burst detection (ti) corresponding to the time of receipt of the downlink radio frame from the SAT 102A.

Similarly, in some examples, the UL delays 420-426 can be calculated relative to the time that the downlink radio frame was sent by the SAT 102A rather than relative to the time of receipt at the UTs 112A-D to avoid misalignments with the target time 404 when calculating the UT delays 430-436. For example, to calculate the UL delays 420-426, the UTs 112A-D can subtract their respective estimated uplink propagation delays from their respective times of downlink transmission or burst detection ($t_{Rx}$) corresponding to the time of receipt of the downlink radio frame from the SAT 102A.

The DL delays 410-416 and the UL delays 420-426 can vary for the UTs 112A-D depending on the physical location of the UTs 112A-D with respect to the SAT 102A and the motion of the SAT 102A. Thus, the UT delays 430-436 for the UTs 112A-D can vary for the different UTs 112A-D depending on their physical location with respect to the SAT 102A and the motion of the SAT 102A. Accordingly, when calculating the DL delays 410-416 and the UL delays 420-426, the UTs 112A-D can account for their physical location with respect to the SAT 102A and the motion of the SAT 102A.

In some cases, the uplink radio frames from the UTs 112A-D and/or the calculation of the DL delays 410-416 and the UL delays 420-426 by the UTs 112A-D can be triggered when the UTs 112A-D receive the downlink radio frame from the SAT 102A. In some examples, using the receipt of the downlink radio frame to trigger the uplink radio frames can obviate absolute time synchronization at the UTs 112A-D, as the downlink radio frame can be used as a reference point and/or parameter for synchronization. The UTs 112A-D can use the relative position of the SAT 102A and the UTs 112A-D to account for propagation delay differences between the UTs 112A-D and ensure more accurate synchronization and UT delay calculations.

In some cases, the SAT 102A can provide ephemeris data to the UTs 112A-D, which the UTs 112A-D can use to calculate the DL delays 410-416 and the UL delays 420-426. In some examples, the SAT 102A can provide the ephemeris data in the downlink radio frame to the UTs 112A-D. The ephemeris data can include, for example and without limitation, a location (current and/or predicted) of the SAT 102A, a velocity (current and/or predicted) of the SAT 102A, a trajectory or estimated track/state of the SAT 102A, timing information, etc.

In some examples, the UTs 112A-D can obtain ephemeris updates and/or data to track the SAT 102A and determine the slant range $L(t_{Rx})$ and velocity $V(t_{Rx})$ of the SAT 102A at the moment that the UTs 112A-D received the downlink radio frame from the SAT 102A (e.g., at downlink transmission or burst detection ($t_{Rx}$). In some examples, the UTs 112A-D can perform satellite ephemeris interpolation based on a satellite position vector, a satellite velocity vector, a user terminal position vector, a user terminal velocity vector, and a respective time at which the UTs 112A-D received the downlink radio frame (e.g., downlink burst detection time). Each of the UTs 112A-D can use the satellite position vector, the satellite velocity vector, the user terminal position vector, the user terminal velocity vector, and the respective time at which the UT received the downlink radio frame to calculate a respective slant range (e.g., line-of-sight distance) between the UT and the SAT 102A at the time at which the UT received the downlink radio frame and a respective radial velocity between the UT and the SAT 102A at the time at which the UT received the downlink radio frame.

In some examples, the UTs 112A-D can receive the satellite position vector and the satellite velocity vector as part of the ephemeris data received from the SAT 102A, as previously explained. In some cases, the satellite position vector and/or the satellite velocity vector can include coordinates at specific time boundaries, such as global positioning system (GPS) 1-second time boundaries.

In some cases, each UT can calculate the interpolated position of satellite $\vec{p}s$ and user terminal $\vec{p}u$ as a linear interpolation by the fractional part of the target time unit, such as the target second. For example, to calculate radial velocity, the satellite velocity (e.g., ECEF satellite velocity) can be projected onto a SAT-UT radial component as follows:

$$n = \text{floor}(t_{rx})$$
$$dt = t_{rx} - \text{floor}(t_{rx})$$
$$\vec{p}s = sat\_pos(n) + dt \cdot sat\_vel(n)$$
$$\vec{p}u = ut\_pos(n) + dt \cdot ut\_vel(n)$$
$$L(t_{rx}) = \sqrt{(\vec{p}s - \vec{p}u)^T \cdot (\vec{p}s - \vec{p}u)}$$
$$V(t_{rx}) = \frac{(\vec{p}s - \vec{p}u)^T \cdot sat\_vel(n)}{\sqrt{(\vec{p}s - \vec{p}u)^T \cdot (\vec{p}s - \vec{p}u)}}$$

Equation (1)

In the above equation, dt is the delta between the time at downlink radio frame transmission and receipt.

In some examples, the UTs 112A-D can take the satellite ephemeris interpolation information as input to calculate the UT delays 430-436. For example, in some cases, each UT can calculate the local UT delay (in units of Tx L2 counts) as follows:

$$D_{UT} = \left(T \cdot \left(1 - \frac{V(t_{rx})}{c}\right) - \frac{2 \cdot L(t_{rx})}{c + V(t_{rx})}\right) \times 540e^6 \quad \text{Equation (2)}$$

In the above equation, T is the target time delay 404 at the satellite (e.g., SAT 102A), c is the speed of light, and $D_{UT}$ is the UT delay (e.g., 430, 432, 434, or 436) and $540e^6$ represents the local Tx L2 counter rate. In some cases, the Equation (2) used to calculate the UT delays 430-436 can be modified to take into account for clock errors between the UT and a reference GPS clock. For example, the equation can be modified as follows to take into account potential errors from a local clock, such as a crystal oscillator (XO), that counts GPS pulses:

$$D_{UT} = \left(T \cdot \left(1 - \frac{V(t_{rx})}{c}\right) - \frac{2 \cdot L(L_{rx})}{c + V(L_{rx})}\right) \cdot \left(1 - \frac{\Delta_{pps}}{R_{pps}}\right) \times 540e^6 \quad \text{Equation (3)}$$

In the above equation, $\Delta pps$ represents a delta count in PPS (pulse-per second), $R_{pps}$ represents a reference count in PPS, and $540e^6$ represents the local Tx L2 counter rate. The reference count can represent the ideal local clock count between two pulse-per-second (PPS) pulses, and the delta PPS count can represent the measured difference from the reference count (e.g., the ideal count) and the actual or observed count at the local clock. In other words, the delta count can indicate the delta between what the count should be and what the count actually is, which can indicate a clock frequency error or shift.

In some cases, a UT can determine a delay estimate D(t) at absolute time t by dividing the slant range L(t) by the speed of light c and a Doppler frequency shift factor α(t) by dividing the radial velocity V(t) by the speed of light c.

In some examples, the UTs 112A-D can calculate the DL delays 410-416 based on the delay estimate $D(t_{rx})$ at downlink radio frame reception time $t_{rx}$ and the Doppler frequency shift factor $\alpha(t_{rx})$ by resolving the recursive formula $D_{DL}=D(t_{rx}-D_{DL})$ as follows, to obtain the delay at the time that the downlink radio frame left the SAT 102A. For example, a first-order Taylor series approximation delay D(t) around the UT downlink receive time $t_{rx}=t+D_{DL}$, can be:

$$D(t_{rx}+\Delta t) \approx D(t_{rx}) + \alpha(t_{rx}) \cdot \Delta t \quad \text{Equation (4)}$$

Where $\alpha(t_{rx})$ is the radial satellite velocity to speed-of-light ratio at the time of the UT's reception of the downlink radio frame. The recursive formula can then be resolved as follows:

$$D_{DL} = D(t_{rx}) + \alpha(t_{rx}) \cdot D_{DL} \Rightarrow D_{DL} = \frac{D(t_{rx})}{1 + \alpha(trx)} \quad \text{Equation (5)}$$

Moreover, in some cases, the UT uplink delay (UL delay 420, 422, 424, or 426) according to the location of the SAT 102A when the SAT 102A receives the uplink radio frame, rather than where the SAT 102A is located when the uplink radio frame is sent, can be calculated as follows:

$$D_{UL} = D(t_{rx} + D_{UT} + D_{UL}) = \quad \text{Equation (6)}$$
$$D(t_{rx} + T - D_{DL}) = D(t_{rx}) + \alpha(t_{rx}) \cdot \left(T - \frac{D(t_{rx})}{1 + \alpha(t_{rx})}\right)$$

The UT can then calculate the uplink time delay $D_{UT}$ (UT delay 430, 432, 434, or 436) as follows:

$$D_{UT} = T - D_{DL} - D_{UL} = T \cdot \alpha(t_{rx}) - \frac{2D(t_{rx})}{1 + \alpha(t_{rx})} \quad \text{Equation (7)}$$

In some cases, the UT can calculate such uplink time delay in terms of UT-SAT slant range L(t), UT-SAT line-of-sight velocity V(t), and speed of light c as follows:

$$D_{UT} = T - \left(\frac{V(t_{rx})}{c}\right) - \frac{2 \cdot L(t_{rx})}{c + V(t_{rx})} \quad \text{Equation (8)}$$

In some cases, the UT and/or the SAT can compensate for frequency offsets produced by the relative motion Doppler and differences in the reference clocks (e.g., OX reference clocks) on either side of the link (e.g., at the UT and/or at the SAT). The relative motion Doppler and differences in the reference clocks can cause carrier frequency offset (CFO) caused by a shift in the local oscillator (LO) frequency, and sampling frequency offset (SFO) caused by a shift in the sample rate of sent (Tx) versus received (Rx) transmissions. CFO and SFO can cause interference between OFDMA sub-carriers (e.g., ICI), resulting in a type of self-interference that can lower the achievable data throughput. The CFO and/or SFO can cause misalignment of UT transmissions corresponding to specific UT allocations (e.g., 310A-B, 312A-B, 314A-C, 316A-B) along a time and frequency domain, which can result in interference. In some examples, the CFO and/or SFO can cause compression or expansion of UT allocations (e.g., 310A-B, 312A-B, 314A-C, 316A-B), which can cause sampling errors at the receiver (e.g., the receiving SAT).

Moreover, with multi-user uplink transmissions, inter-carrier interference can occur over the air between UTs and cannot be easily post-compensated by the SAT receiver, especially if the receiver modem uses a common FFT calculation to demodulate all of the users. Therefore, in some cases, CFO from Doppler and UT XO offset can be pre-compensated by the UTs. The compensation for frequency offsets and timing differences as described herein can correct any compression or expansion of UT allocations and prevent self-interference and/or inter-carrier interference.

In some examples, Doppler frequency offset can be predicted using the UT GPS position and the SAT ephemeris (e.g., position and velocity). The UT XO can be estimated from the frequency error reported by a downlink UT burst detector at the UT. Alternatively, in some examples, the UT GPS pulse-per-second (PPS) can estimate UT XO offset as illustrated in Equation (3). In some cases, the Satellite XO offset can be pre-compensated and-post-compensated by the SAT from the SAT's GPS.

In some examples, on the downlink side, the SAT can pre-compensate for SAT XO offset (e.g., using GPS and PPS) as follows:

$$F_{Tx\_Adj} = +F_{(DL\_LO)} \cdot \frac{\Delta_{pps}}{R_{pps}} \quad \text{Equation (9)}$$

Here, $F_{(DK\_LO)}$ can represent the RF channel frequency configured for the Ku-band downlink (e.g., SAT Tx local OX and UT Rx local OX), and $F_{Tx\_Adj}$ can represent the Tx frequency offset.

Moreover, on the downlink side, the UT can remove the residual frequency offset, which includes the downlink Doppler and the UT XO offset. In some cases, the frequency offset can be predicted based on a position of the UT and the satellite ephemeris (e.g., position and velocity). The UT can record the measured frequency offset $F_{Rx\_Burst}$ and can estimate the UT XO correction factor as follows:

$$UTXO_{factor} = \frac{F_{Rx\_Burst}}{F_{(DL\_LO)}} - \frac{-Vel(SAT, UT)}{c} \quad \text{Equation (10)}$$

Here, Vel(SAT, UT) can represent the line-of-sight velocity between the SAT and the UT and c represents the speed of light. In some cases, the $UTXO_{factor}$ can be averaged over a certain number of radio frames to reduce estimate variance. Moreover, this average value can be used for UT-UL Tx pre-compensation.

In some examples, on the uplink side, the SAT can post-compensate for SAT XO offset (e.g., using GPS and PPS) as follows:

$$F_{Rx\_Adj} = -F_{(UL\_LO)} \cdot \frac{\Delta_{pps}}{R_{pps}} \quad \text{Equation (11)}$$

Here, $F_{(UL\_LO)}$ can represent the RF channel frequency configured for the Ku-band uplink (e.g., the UT Tx local OX and the SAT Rx local OX), and $F_{Rx\_Adj}$ can represent the Rx frequency offset.

Moreover, on the uplink side, the UT can pre-compensate for UT XO offset and uplink Doppler as follows:

$$F_{Tx\_Adj} = F_{(UL\_LO)} \cdot UTXO_{factor} - F_{(UL_{LO})} \frac{-Vel(SAT, UT)}{c} \quad \text{Equation (12)}$$

In some cases, throughout the radio frame (e.g., radio frame 200), pilot symbols (e.g., pilot subcarriers 280) can be employed to track phase and amplitude variations (e.g., from LO phase noise, residual sample-rate and timing error, etc.). Pilot symbols can include known pseudo-random quadrature phase shift keying (QPSK) points that are measured by a demodulator. Any measured phase or amplitude error can be removed and the same correction can be applied to data subcarriers in the given time-domain symbol (e.g., after linearly interpolating the correction between upper and lower pilots over frequency).

As previously noted, the difference between Tx and Rx clocks on either side of a link (e.g., downlink and/or uplink, or UT side and/or SAT side) and Doppler time compression/expansion in the channel can cause SFO. A sampler, such as sampler 662 described below with respect to FIG. 6B, can correct for resulting errors, such as accumulating timing error that accumulates across a radio frame and can eventually consume time-domain samples of a cyclic prefix for later OFDMA symbols which can result in ISI, and spectral compression/expansion (e.g., frequency shift proportional to sub-carrier frequency) within a single symbol which can cause ISI.

To correct such errors, the sampler can perform a true time-domain sample rate conversion using a Farrow fractional delay structure and timing controller. The frequency error caused by SFO can be a subcarrier percentage at band edge, as illustrated below:

$$\epsilon = 100 \times \frac{N_{SC}}{2} \times SFO_{ppm} \cdot 10^{-6} \quad \text{Equation (13)}$$

Figure 5:
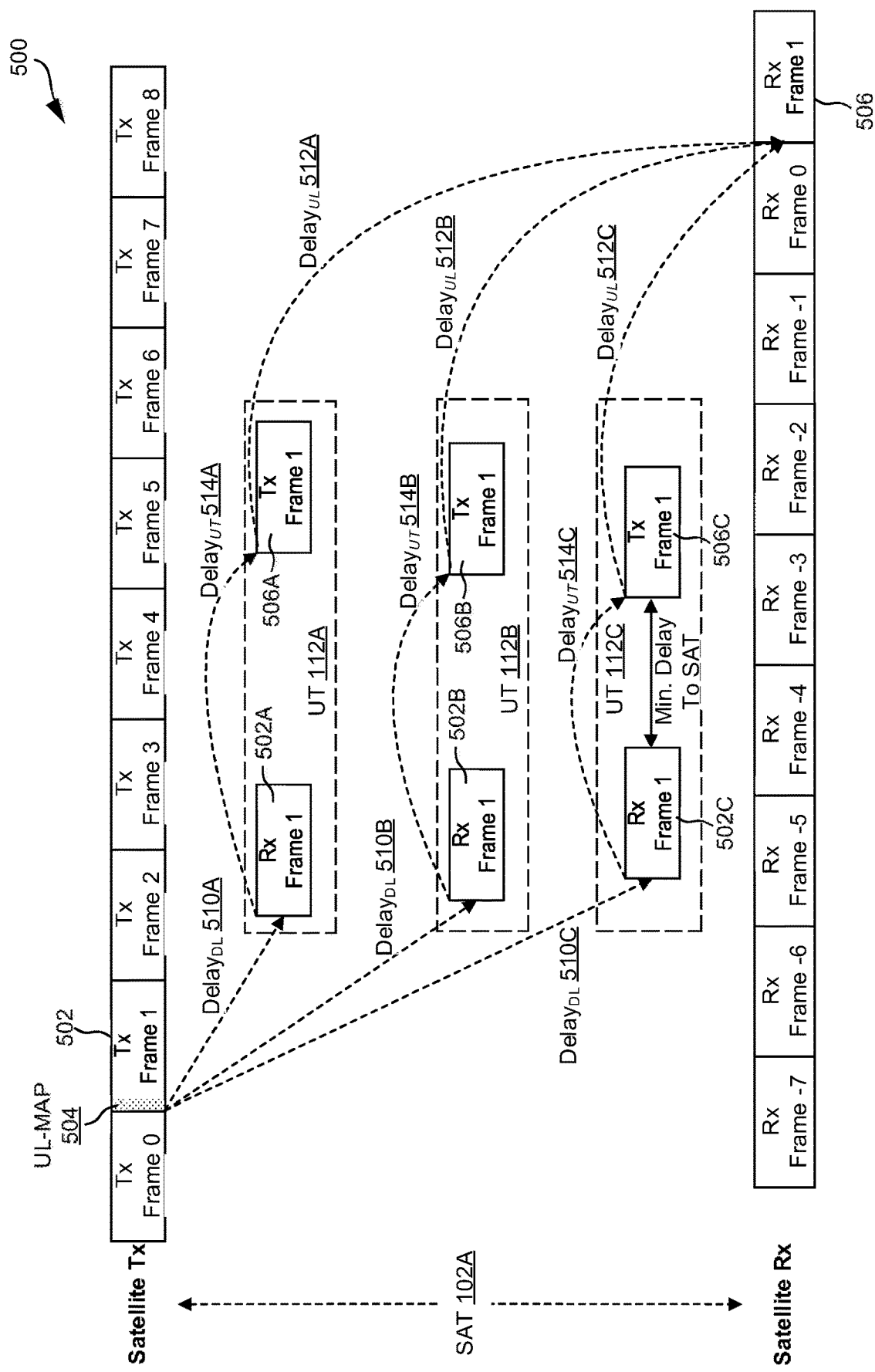
FIG. 5 is a diagram illustrating an example multi-user synchronization of radio frames in a satellite communication system, in accordance with some examples of the present disclosure.

FIG. 5 is a diagram illustrating an example multi-user synchronization 500 of radio frames in a satellite communication system. In this example, the multi-user synchronization 500 is triggered or initiated in response to a downlink radio frame 502 transmitted by the SAT 102A to UTs 112A-C.

In some examples, the downlink radio frame 502 can specify a target time (e.g., target time 404) in the UL-MAP 504. The target time can indicate the time that uplink radio frames 506A-C from the UTs 112A-C should arrive at the SAT 102A. As previously explained, the UTs 112A-C can use the target time to calculate UT delays 514A-C indicating when to transmit, or how much to delay transmissions of, the uplink radio frames 506A-C to ensure they arrive at the SAT 102A in a synchronized manner (e.g., at the same time or substantially the same time).

In some cases, the UL-MAP 504 can include other information that the UTs 112A-C can use to transmit the uplink radio frames 506A-C. For example, the UL-MAP 504 can include ephemeris data that the UTs 112A-C can use to calculate downlink propagation delays 510A-C and/or uplink propagation delays 512A-C used by the UTs 112A-C to determine the UT delays 514A-C.

After the SAT 102A transmits the downlink radio frame 502, the UTs 112A-C receive the downlink radio frame 502 as respective downlink radio frames 502A-C and calculate the UT delays 514A-C in order to determine when to transmit their respective uplink radio frames 506A-C to the SAT 102A. To calculate the UT delays 514A-C, each of the UTs 112A-C can calculate a downlink propagation delay 510A-C from the time that the downlink radio frame 502 was transmitted by the SAT 102A, and an uplink propagation delay 512A-C for the respective uplink radio frames 506A-C. The downlink propagation delays 510A-C and/or the uplink propagation delays 512A-C can account for the velocity of the SAT 102A and the relative distance/position of the SAT 102A and the UTs 112A-C. In some examples, the UTs 112A-C can calculate the UT delays 514A-C, the downlink propagation delays 510A-C, and/or the uplink propagation delays 512A-C using any of Equations 1 through 8.

Once the UTs 112A-C have determined their respective UT delays 514A-C, the UTs 112A-C can transmit their respective uplink radio frames 506A-C to the SAT 102A based on the UT delays 514A-C. The SAT 102A can then receive the uplink radio frames 506A-C within a same RX radio frame 506 and/or frame time. Thus, the SAT 102A can receive the uplink radio frames 506A-C in a synchronized manner (e.g., synchronized in time).

The UT delays 514A-C can indicate when the UTs 112A-C should send the uplink radio frames 506A-C to ensure they arrive at the SAT 102A in a synchronized manner. Accordingly, the UTs 112A-C can use the UT delays 514A-C to determine when to transmit the uplink radio frames 506A-C so the uplink radio frames 506A-C arrive at the SAT 102A at the target time provided by the SAT 102A and used by the UTs 112A-C to calculate the UT delays 514A-C. For example, the UTs 112A-C can delay their transmissions (or time the sending of their transmissions) of the uplink radio frames 506A-C an amount of time corresponding to, or consistent with, the UT delays 514A-C to ensure the uplink radio frames 506A-C are received by the SAT 102A at the target time.

Since the downlink propagation delays 510A-C and/or uplink propagation delays 512A-C of the UTs 112A-C can vary based on one or more factors including the relative distance of the SAT 102A and the UTs 112A-C, the UT delays 514A-C for the different UTs 112A-C can vary. Thus, based on the UT delays 514A-C, the time when the UTs 112A-C transmit the uplink radio frames 506A-C vary. Nevertheless, the UT delays 514A-C can allow the UTs 112A-C to time their transmissions of the uplink radio frames 506A-C so they arrive at the SAT 102A at the target time, in a synchronized manner. The uplink radio frames 506A-C can arrive at the SAT 102A at the location of the SAT 102A calculated for the target time. In other words, the uplink radio frames 506A-C can arrive at the location of the SAT 102A at the target time, rather than the location of the SAT 102A when the SAT 102A transmitted the downlink radio frame 502 or when the UTs 112A-C transmitted the uplink radio frames 506A-C.

Figure 6A:
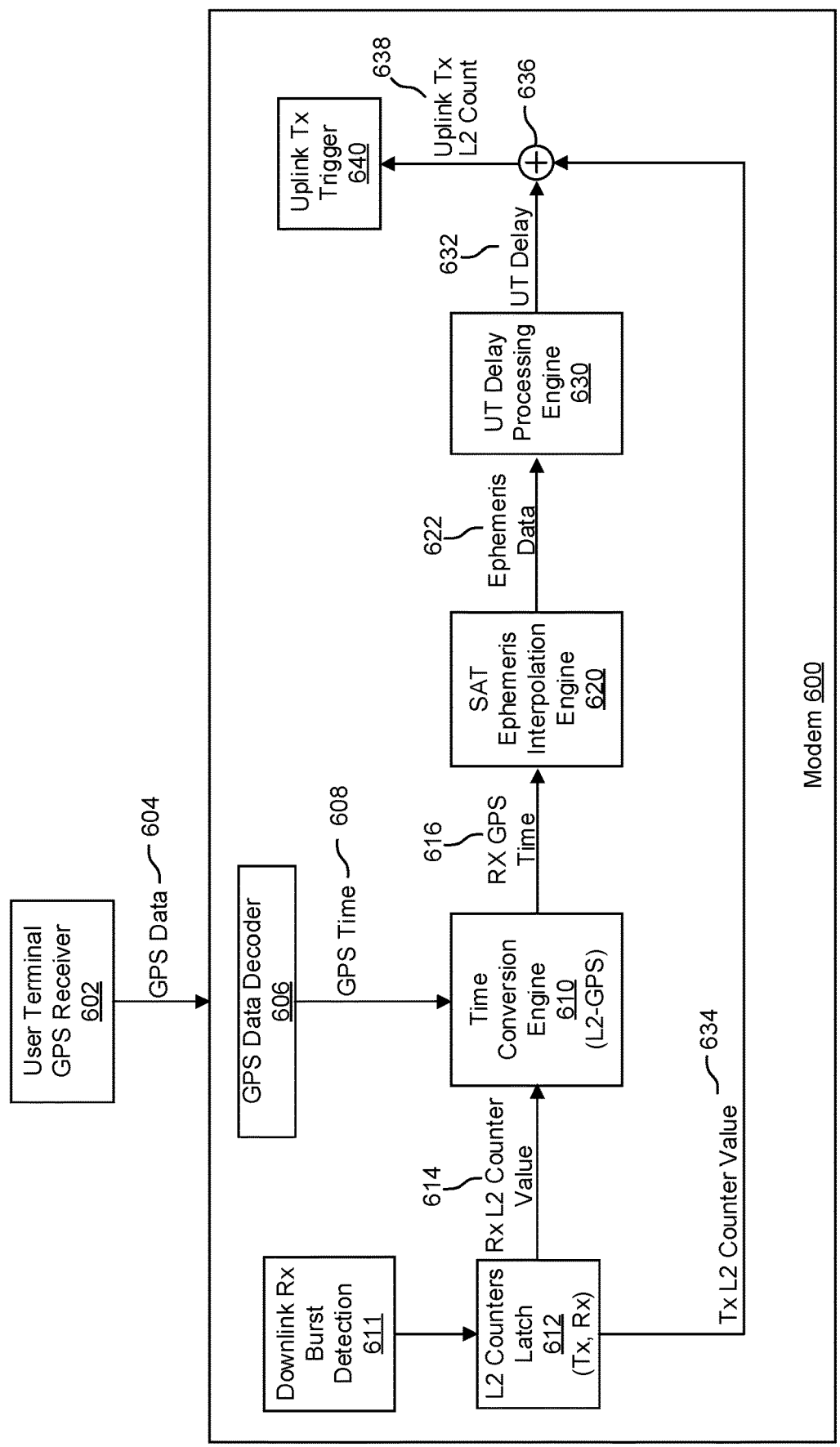
FIG. 6A is a block diagram illustrating an example modem for synchronizing radio transmissions, in accordance with some examples of the present disclosure.

FIG. 6A is a block diagram illustrating an example modem 600 for synchronizing radio transmissions. In some examples, the modem 600 can be implemented by the UTs 112A-C to manage the timing of uplink radio frames transmitted to a SAT. For example, the modem 600 can calculate UT delay values that the UTs 112A-C can use to transmit uplink radio frames to a SAT in a synchronized manner, as previously explained.

The modem 600 can include a time conversion engine 610 for converting an Rx L2 counter value 614 (e.g., clock counter values or ticks) to GPS time to determine an RX GPS time 616 corresponding to a GPS time when a downlink radio frame or burst was received by the UT associated with the modem 600. The time conversion engine 610 can receive the Rx L2 counter value 614 from L2 counters latch 612. In some cases, the L2 counters latch 612 can receive a downlink Rx burst detection L2 time value from a downlink Rx burst detection component 611 and output the Rx L2 counter value 614. In some examples, the Rx L2 counter value 614 can include an Rx L2 counter value corresponding to L2 counts or ticks from the time a downlink radio frame or burst was received by the UT. For example, in some cases, the Rx L2 counter value 614 can include an Rx L2 counter value latched on the last downlink Rx burst detection based on the downlink Rx burst detection L2 time value from the downlink Rx burst detection component 611. In some cases, the L2 counters latch 612 can also output a TX L2 counter value 634, as illustrated in FIG. 6A.

In some examples, the Tx L2 counter value 634 can correspond to L2 counts or ticks from the time that an uplink radio frame was transmitted by the UT. In some examples, the L2 counts or ticks can correspond to, or be based on, pulses from a clock, such as a crystal oscillator, at the UT. In some examples, the L2 counter values (e.g., Rx L2 counter value 614 and/or Tx L2 counter value 634) can include PPS counts, such as $\Delta_{pps}$ and/or $R_{pps}$, as previously described with respect to Equation (3). In some cases, the Tx L2 counter value 634 can include a Tx L2 counter value latched on the last 1 Hz PPS edge. Moreover, in some cases, the Tx L2 counter value 634 can be a Tx L2 counter value on the last downlink Rx burst detection (e.g., relative to the downlink Rx burst detection L2 time value from the downlink Rx burst detection component 611).

The time conversion engine 610 can receive the Rx L2 counter value 614 and GPS time 608 to translate the Rx L2 counter value 614 to the Rx GPS time 616. The GPS time 608 can include GPS time information decoded by a GPS data decoder 606 from GPS data 604 received from a UT GPS receiver 602, such as $t_{rx}$ as shown in Equation (8). As previously noted, the Rx GPS time 616 can indicate the time in GPS that the UT received a downlink radio frame from the SAT.

The time conversion engine 610 can provide the Rx GPS time 616 to a SAT ephemeris interpolation engine 620, which can use the Rx GPS time 616 to calculate ephemeris interpolation data 622. In some examples, the SAT ephemeris interpolation engine 620 can calculate the interpolated position of satellite $\vec{p}s$ and user terminal $\vec{p}u$ as a linear interpolation by the fractional part of the target time unit associated with the target time from the SAT, such as the target second. For example, to calculate radial velocity, the satellite velocity (e.g., ECEF satellite velocity) can be projected onto a SAT-UT using Equation (1), as previously explained.

In some cases, the SAT ephemeris interpolation engine 620 can use the Rx GPS time 616, a satellite position vector and a satellite velocity vector to calculate the ephemeris interpolation data 622. The ephemeris interpolation data 622 can include a velocity of the SAT and a relative distance (e.g., a slant range) of the UT and the SAT, such as UT-SAT slant range L (t) and UT-SAT line-of-sight velocity V(t) as shown in Equation (8).

In some examples, the modem 600 (or the UT associated with the modem 600) can receive the satellite position vector and the satellite velocity vector from the SAT. In some cases, the satellite position vector and/or the satellite velocity vector can include coordinates at specific time boundaries, such as GPS time boundaries.

The SAT ephemeris interpolation engine 620 can provide the ephemeris interpolation data 622 to a UT delay processing engine 630, which can calculate the UT delay 632 based on the ephemeris interpolation data 622. The UT delay processing engine 630 can also use estimated downlink and uplink propagation delays (e.g., 410 and 420) to calculate the UT delay 632 (e.g., $D_{UT}$ as shown in Equations (2), (3), or (8)). In some examples, the UT delay processing engine 630 can calculate the UT delay 632 using Equation (2), (3), or (8) as previously described. Moreover, in some examples, the UT delay processing engine 630 can calculate the downlink and uplink propagation delays using any of Equations (4) through (8), as previously described.

In some examples, the UT delay 632 can be computed in units of a Tx L2 count. Moreover, the UT delay processing engine 630 can provide the UT delay 632 as a Tx L2 count to a summation component 636, which can generate an uplink Tx L2 count 638 based on the UT delay 632 and the Tx L2 counter value 634 from the L2 counters latch 612. The uplink Tx L2 count 638 can provide the target L2 count for the uplink radio frames from the UTs 112A-C. An uplink Tx trigger 640 can receive the uplink Tx L2 count 638 and use the uplink Tx L2 count 638 to trigger an uplink transmission at the proper time (e.g., at the target delay time) which, based on the uplink Tx L2 count 638 can arrive at the SAT on the target time within a same radio frame as other uplink transmissions.

Figure 6B:
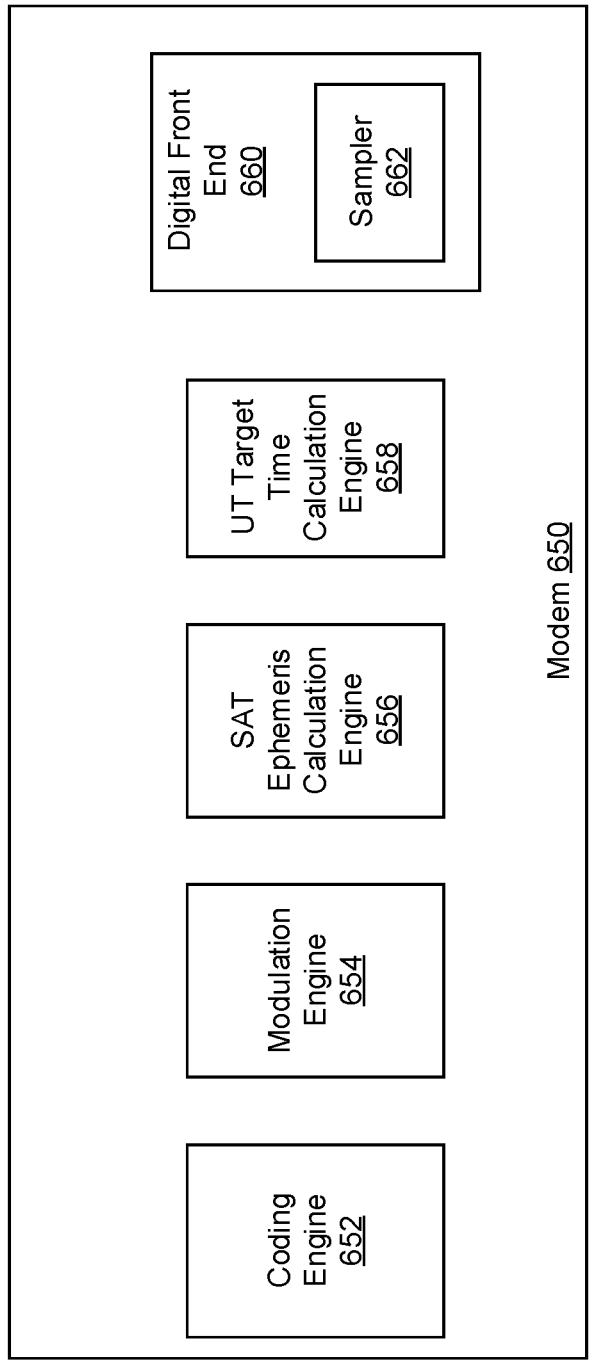
FIG. 6B is a simplified block diagram illustrating an example modem for synchronizing radio transmissions, in accordance with some examples of the present disclosure.

FIG. 6B is a simplified block diagram illustrating an example modem 650 for synchronizing radio transmissions. In some examples, the modem 650 can be implemented by a satellite system, such as SAT 102A. The modem 650 can include a coding engine 652 for performing coding operations. The coding operations performed by the coding engine 652 can include, for example and without limitation, bit scrambling, low-density parity-check (LDPC) coding, constellation mapping, among others.

The modem 650 can also include a modulation engine 654. The modulation engine 654 can perform various operations such as, for example and without limitation, pilot processing, channel estimation, rotational scrambling, user mapping, modulation (e.g., Fast Fourier Transform (FFT) modulation, etc.), de-modulation (e.g., Inverse FFT de-modulation, etc.), synchronization, digital filtering, among others.

Moreover, the modem 650 can include a SAT ephemeris calculation engine 656. The SAT ephemeris calculation engine 656 can calculate ephemeris data associated with the SAT, such as UT-SAT slant range L(t) and UT-SAT line-of-sight velocity V(t) as shown in Equation (8). The SAT can provide the ephemeris data to user terminals in a downlink radio frame to the user terminals. In some examples, the user terminals can use the ephemeris data to calculate UT delays (e.g., $D_{UT}$ as shown in Equations (2), (3), or (8)), as previously described.

The modem 650 can include a UT target time calculation engine 658 for calculating UT target times (e.g., 404), which user terminals can use to synchronize their uplink transmissions to the SAT, as previously described. In some examples, the UT target time calculation engine 658 can calculate a UT target time relative to a reference time. The reference time can be based on, for example, a downlink transmission time (e.g., a time when the SAT sends or sent a downlink transmission to the user terminals), an uplink receive time (e.g., a time when the SAT receives or received an uplink radio frame associated with the user terminals), a current time at the SAT, or any other time.

In some cases, a UT target time can provide a target delay from the reference time to when the SAT should receive (or expects to receive) uplink radio frames from the user terminals. In some examples, the UT target time calculation engine 658 can use the ephemeris data to calculate the UT target time. Moreover, in some examples, the UT target time calculation engine 658 can calculate the UT target time based on a downlink propagation delay (e.g., an amount of time estimated to take a downlink transmission from the SAT to reach all of the user terminals) and an uplink propagation delay (e.g., an amount of time estimated to take uplink radio frames from all the user terminals to reach the SAT).

The modem 650 can include a digital front end (DFE) 660 which can perform, for example and without limitation, up-sampling, down-sampling, re-sampling, dual-mode combining, crest factor reduction, digital pre-distortion, among other operations. In some examples, the DFE 660 can implement a sampler 662, which can perform up-sampling, down-sampling, and re-sampling.

In some examples, the sampler 662 can perform re-sampling for uplink radio frames received by the SAT to correct clock and/or frequency shift errors. For example, the sampler 662 can perform a sample rate conversion to compensate for SFO and/or other timing corrections, such as a timing error that accumulates across a radio frame and can consume time-domain samples of a cyclic prefix for later OFDMA symbols, which can result in ISI, and spectral compression/expansion (e.g., frequency shift proportional to sub-carrier frequency) within a single symbol, which can cause ISI. In some examples, the sampler 662 can perform sample rate conversion using any of Equations (8) through (13), as previously described.

In some examples, the sampler 662 can be part of, or implemented by, the digital front end 660, as shown in FIG. 6B. In other examples, the sampler 662 can be separate from the digital front end 660. Moreover, while the modem 650 illustrates certain components, it should be noted that such components are provided as non-limiting examples for simplicity and explanation purposes. One of ordinary skill in the art will recognize that, in other examples, the modem 650 can include more or less components (and types of components) than those shown in FIG. 6B.

Having disclosed example systems, components and concepts, the disclosure now turns to the example method 700 for synchronizing multi-user uplink transmissions, as shown in FIG. 7. The steps outlined herein are non-limiting examples provided for illustration purposes, and can be implemented in any combination thereof, including combinations that exclude, add, or modify certain steps.

At block 702, the method 700 can include receiving, by a user terminal (e.g., 112A), a downlink radio frame (e.g., 502A) transmitted by a satellite (e.g., 102A). In some examples, the downlink radio frame can be a radio frame transmitted or broadcasted by the satellite to multiple user terminals (e.g., 112A-D).

In some examples, the downlink radio frame can include an indication of a target time (e.g., 404) for when uplink radio frames from the user terminal and other user terminals should arrive at the satellite for synchronization between the uplink radio frames. For example, the satellite can specify the target time in a UL-MAP in the downlink radio frame.

In some examples, the user terminal can remove a frequency offset from the downlink radio frame. The user terminal can calculate the frequency offset based on a position of the user terminal and the ephemeris of the satellite (e.g., satellite position and velocity). In some cases, the user terminal can calculate a downlink correction factor associated with the downlink radio frame to post-compensate for a local clock error associated with the downlink radio frame. In some cases, the downlink correction factor can be calculated based on, for example, the frequency offset associated with the downlink radio frame, a downlink channel frequency, a velocity of the satellite and/or a distance between the user terminal and the satellite.

At block 704, the method 700 can include determining, by the user terminal, a downlink propagation delay (e.g., 410, 510A) associated with the downlink radio frame and an uplink propagation delay (e.g., 420, 512A) associated with an uplink radio frame (e.g., 506C) from the user terminal to the satellite. The downlink propagation delay and the uplink propagation delay can be determined based on a velocity of the satellite and a distance between the user terminal and the satellite. In some examples, the downlink propagation delay and the uplink propagation delay can be determined based on any of Equations (4) through (8), as previously described.

At block 706, the method 700 can include based on the downlink propagation delay and the uplink propagation delay, determining, by the user terminal, an uplink transmission delay (e.g., 430, 514A) indicating an amount of time to delay a transmission of the uplink radio frame to the satellite so the uplink radio frame arrives at the satellite at a same target time (e.g., 404) as one or more additional uplink radio frames (e.g., 506B, 506B) from one or more additional user terminals, such as UTs 112B, 112C, and 112D. The target time can specify a time-of-arrival for uplink radio frames from the user terminal and the one or more additional user terminals to the satellite. In some cases, the time-of-arrival can be based on an estimated location of the satellite at the time-of-arrival.

The uplink transmission delay can be calculated relative to the time the user terminal receives the downlink radio frame (e.g., 502A) transmitted by the satellite (e.g., 102A). Thus, since the downlink propagation delay can vary between user terminals, the reference point (e.g., the time of receipt of the downlink radio frame) used by each user terminal to calculate its respective uplink transmission delay can also vary. In some examples, the uplink transmission delay can also be based on the target time. Thus, the uplink transmission delay can be calibrated to ensure that the uplink radio frame transmitted by the user terminal to the satellite arrives at the satellite at the same target time as the one or more additional uplink radio frames from the one or more additional user terminals. In some examples, the uplink transmission delay (e.g., $D_{UT}$) can be calculated as shown in Equations (2), (3), or (8).

In some cases, the downlink propagation delay and/or the target time can be determined relative to a particular time when the satellite transmitted the downlink radio frame. Moreover, in some examples, the uplink propagation delay can be determined relative to the target time, and the target time and/or the distance between the user terminal and the satellite can be based on an estimated location of the satellite at target time.

In some examples, the target time can be associated with an OFDMA superframe having a length corresponding to a synchronization period for the uplink radio frame and the one or more additional uplink radio frames. The superframe can include contiguous, non-overlapping slots along frequency and time dimensions (e.g., 204-206, 300-302) for the uplink radio frame and the one or more additional uplink radio frames.

At block 708, the method 700 can include determining a correction factor for the uplink radio frame. The correction factor can pre-compensate for a local clock error and/or an uplink frequency offset associated with the uplink radio frame. In some examples, the correction factor can be calculated based on Equation (3) and/or any of Equations (9) through (13), as previously described. The correction factor can be applied to the uplink radio frame to pre-compensate for the local clock error and/or the uplink frequency offset.

In some examples, the correction factor for the uplink radio frame can be calculated based on a downlink correction factor associated with the downlink radio frame, an uplink channel frequency, a velocity of the satellite and/or a distance between the user terminal and the satellite. As previously noted, the downlink correction factor can be calculated based on a frequency offset associated with the downlink radio frame, a downlink channel frequency, the velocity of the satellite and/or the distance between the user terminal and the satellite.

At block 710, the method 700 can include transmitting, by the user terminal, the uplink radio frame at a time corresponding to the uplink transmission delay. The uplink radio frame transmitted by the user terminal can include and/or compensate for the Doppler frequency offset as previously noted. The uplink radio frame can be an OFDMA frame. Moreover, the user terminal and the one or more additional user terminals can include half-duplex transceivers for receiving downlink radio frames and transmitting uplink radio frames.

In some examples, the method 700 may be performed by one or more computing devices or apparatuses. In one illustrative example, the method 700 can be performed by a user terminal or SAT shown in FIG. 1A and/or one or more computing devices with the computing device architecture 800 shown in FIG. 8. In some cases, such a computing device or apparatus may include a processor, microprocessor, microcomputer, or other component of a device that is configured to carry out the steps of the method 700. In some examples, such computing device or apparatus may include one or more antennas for sending and receiving RF signals. In some examples, such computing device or apparatus may include an antenna and a modem for sending, receiving, modulating, and demodulating RF signals, as previously described.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. The computing device may further include a display (as an example of the output device or in addition to the output device), a network interface configured to communicate and/or receive the data, any combination thereof, and/or other component(s). The network interface may be configured to communicate and/or receive Internet Protocol (IP) based data or other type of data.

The method 700 is illustrated as a logical flow diagram, the operations of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the method 700 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

FIG. 8 illustrates an example computing device architecture 800 of an example computing device which can implement various techniques described herein. For example, the computing device architecture 800 can be used to implement at least some portions of the SATs 102, the SAGs 104, the user terminals 112 and/or the user network devices 114 shown in FIGS. 1A and 1B, and perform at least some uplink time synchronization operations as described herein. The components of the computing device architecture 800 are shown in electrical communication with each other using a connection 805, such as a bus. The example computing device architecture 800 includes a processing unit (CPU or processor) 810 and a computing device connection 805 that couples various computing device components including the computing device memory 815, such as read only memory (ROM) 820 and random access memory (RAM) 825, to the processor 810.

The computing device architecture 800 can include a cache of high-speed memory connected directly with, in close proximity to, or integrated as part of the processor 810. The computing device architecture 800 can copy data from the memory 815 and/or the storage device 830 to the cache 812 for quick access by the processor 810. In this way, the cache can provide a performance boost that avoids processor 810 delays while waiting for data. These and other modules can control or be configured to control the processor 810 to perform various actions. Other computing device memory 815 may be available for use as well. The memory 815 can include multiple different types of memory with different performance characteristics. The processor 810 can include any general purpose processor and a hardware or software service stored in storage device 830 and configured to control the processor 810 as well as a special-purpose processor where software instructions are incorporated into the processor design. The processor 810 may be a self-contained system, containing multiple cores or processors, a bus, memory controller, cache, etc. A multi-core processor may be symmetric or asymmetric.

To enable user interaction with the computing device architecture 800, an input device 845 can represent any number of input mechanisms, such as a microphone for speech, a touch-sensitive screen for gesture or graphical input, keyboard, mouse, motion input, speech and so forth. An output device 835 can also be one or more of a number of output mechanisms known to those of skill in the art, such as a display, projector, television, speaker device. In some instances, multimodal computing devices can enable a user to provide multiple types of input to communicate with the computing device architecture 800. The communication interface 840 can generally govern and manage the user input and computing device output. There is no restriction on operating on any particular hardware arrangement and therefore the basic features here may easily be substituted for improved hardware or firmware arrangements as they are developed.

Storage device 830 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 825, read only memory (ROM) 820, and hybrids thereof. The storage device 830 can include software, code, firmware, etc., for controlling the processor 810. Other hardware or software modules are contemplated. The storage device 830 can be connected to the computing device connection 805. In one aspect, a hardware module that performs a particular function can include the software component stored in a computer-readable medium in connection with the necessary hardware components, such as the processor 810, connection 805, output device 835, and so forth, to carry out the function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some examples, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication devices, or integrated circuit devices having multiple uses including application in wireless communications and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

What is claimed is:

1. A method comprising:
   receiving, by a user terminal, a downlink radio frame transmitted by a satellite, wherein the downlink radio frame comprises a target time for an uplink radio frame from the user terminal and one or more additional uplink radio frames from one or more additional user terminals to arrive at the satellite;
   determining, by the user terminal, a downlink propagation delay associated with the downlink radio frame and an uplink propagation delay associated with the uplink radio frame to be transmitted from the user terminal to the satellite;
   based on the target time, the downlink propagation delay and the uplink propagation delay, determining, by the user terminal, an uplink transmission delay indicating an amount of time to delay a transmission of the uplink radio frame to the satellite, wherein the uplink transmission delay is determined for the uplink radio frame to arrive at the satellite at the target time, wherein the target time comprises a same target time as the one or more additional uplink radio frames from the one or more additional user terminals;
   transmitting, by the user terminal, the uplink radio frame at a time corresponding to the uplink transmission delay;
   removing a downlink frequency offset from the downlink radio frame, the downlink frequency offset being estimated based on a velocity and position of the satellite;
   correcting timing information associated with the downlink radio frame based on a downlink correction factor that post-compensates for a local clock error;
   determining an uplink correction factor associated with the uplink radio frame, wherein the uplink correction factor pre-compensates for at least one of the local clock error or an uplink Doppler frequency offset; and
   applying the uplink correction factor to the uplink radio frame.

2. The method of claim 1, wherein the downlink propagation delay and the uplink propagation delay are determined based on a velocity of the satellite and a distance between the user terminal and the satellite.

3. The method of claim 2, wherein a round trip time associated with the user terminal comprising the uplink propagation delay and the downlink propagation delay is a longest round trip time relative to respective round trip times associated with the one or more additional user terminals and wherein the target time follows transmission of the downlink radio frame from the satellite by at least the longest round trip time.

4. The method of claim 1, wherein at least one of the downlink propagation delay or the uplink transmission delay is determined relative to a particular time when the satellite transmitted the downlink radio frame.

5. The method of claim 1, wherein the uplink propagation delay is determined relative to the target time, and wherein at least one of the uplink transmission delay or a distance between the user terminal and the satellite is based on an estimated location of the satellite at the target time.

6. The method of claim 1, wherein the target time specifies a time-of-arrival for uplink radio frames from the user terminal and the one or more additional user terminals to the satellite, the time-of-arrival being associated with an estimated location of the satellite at the time-of-arrival.

7. The method of claim 1, wherein the uplink radio frame comprises an orthogonal frequency division multiple access (OFDMA) frame, and wherein the user terminal and the one or more additional user terminals comprise half-duplex transceivers.

8. The method of claim 1, wherein the target time is associated with an OFDMA superframe having a length corresponding to a synchronization period for the uplink radio frame and the one or more additional uplink radio frames, wherein the OFDMA superframe comprises non-overlapping slots along frequency and time dimensions for the uplink radio frame and the one or more additional uplink radio frames.

9. A user terminal comprising:
   one or more processors; and
   at least one non-transitory computer-readable medium having stored thereon instructions that, when executed by the one or more processors, cause the user terminal to:
   receive a downlink radio frame transmitted by a satellite, wherein the downlink radio frame comprises a target time for an uplink radio frame from the user terminal and one or more additional uplink radio frames from one or more additional user terminals to arrive at the satellite;

determine a downlink propagation delay associated with the downlink radio frame and an uplink propagation delay associated with the uplink radio frame to be transmitted from the user terminal to the satellite;

based on the target time, the downlink propagation delay and the uplink propagation delay, determine an uplink transmission delay indicating an amount of time to delay a transmission of the uplink radio frame to the satellite, wherein the uplink transmission delay is determined for the uplink radio frame to reach the satellite at the target time, wherein the target time comprises a same target time as the one or more additional uplink radio frames from the one or more additional user terminals;

transmit the uplink radio frame at a time corresponding to the uplink transmission delay;

remove a downlink frequency offset from the downlink radio frame, the downlink frequency offset being estimated based on a velocity and position of the satellite;

correct timing information associated with the downlink radio frame based on a downlink correction factor that post-compensates for a local clock error;

determine an uplink correction factor associated with the uplink radio frame, wherein the uplink correction factor pre-compensates for at least one of the local clock error and an uplink Doppler frequency offset; and apply the uplink correction factor to the uplink radio frame.

10. The user terminal of claim 9, wherein the downlink propagation delay and the uplink propagation delay are determined based on a velocity of the satellite and a distance between the user terminal and the satellite.

11. The user terminal of claim 9, wherein the downlink radio frame comprises an indication of the same target time, wherein the uplink transmission delay is determined further based on the same target time at least one of the downlink propagation delay or the uplink transmission delay is determined relative to a particular time when the satellite transmitted the downlink radio frame.

12. The user terminal of claim 9, wherein at least one of the downlink propagation delay and the same target time is determined relative to a particular time when the satellite transmitted the downlink radio frame, wherein the uplink propagation delay is determined relative to the same target time, and wherein at least one of the uplink transmission delay, the same target time or and a distance between the user terminal and the satellite is based on an estimated location of the satellite at the target time.

13. The user terminal of claim 9, wherein the target time specifies a time-of-arrival for uplink radio frames from the user terminal and the one or more additional user terminals to the satellite, the time-of-arrival being associated with an estimated location of the satellite at the target time.

14. The user terminal of claim 9, wherein the uplink radio frame comprises an orthogonal frequency division multiple access (OFDMA) frame, and wherein the user terminal and the one or more additional user terminals comprise half-duplex transceivers.

15. The user terminal of claim 9, wherein the target time is associated with an OFDMA superframe having a length corresponding to a synchronization period for the uplink radio frame and the one or more additional uplink radio frames, wherein the OFDMA superframe comprises non-overlapping slots along frequency and time dimensions for the uplink radio frame and the one or more additional uplink radio frames.

16. At least one non-transitory computer-readable medium having stored thereon instructions that, when executed by one or more processors, cause the one or more processors to:

receive, at a user terminal, a downlink radio frame transmitted by a satellite, wherein the downlink radio frame comprises a target time for an uplink radio frame from the user terminal and one or more additional uplink radio frames from one or more additional user terminals to arrive at the satellite;

remove a downlink frequency offset from the downlink radio frame, wherein the downlink frequency offset is determined based on a position of the user terminal and a velocity of the satellite and a distance between the user terminal and the satellite;

determine, at the user terminal, based on the target time, an uplink transmission delay indicating an amount of time to delay a transmission of the uplink radio frame to the satellite, wherein the uplink transmission delay is determined for the uplink radio frame to reach the satellite at the target time, wherein the target time comprises a same target time as the one or more additional uplink radio frames from the one or more additional user terminals;

determine an uplink correction factor associated with the uplink radio frame, wherein the uplink correction factor pre-compensates for at least one of a local clock error and an uplink frequency offset associated with the uplink radio frame;

apply the uplink correction factor to the uplink radio frame;

transmit, at the user terminal, the uplink radio frame at a time corresponding to the uplink transmission delay; and determine a downlink correction factor associated with the downlink radio frame, wherein the downlink correction factor is based on at least one of the downlink frequency offset, a downlink channel frequency, the velocity of the satellite and the distance between the user terminal and the satellite, and wherein the uplink correction factor is based on at least one of the downlink correction factor, an uplink channel frequency, the velocity of the satellite and the distance between the user terminal and the satellite.

17. The at least one non-transitory computer-readable medium of claim 16, further comprising instructions that, when executed by the one or more processors, cause the one or more processors to:

determine a downlink propagation delay associated with the downlink radio frame and an uplink propagation delay associated with the uplink radio frame, wherein the downlink propagation delay and the uplink propagation delay are determined based on a velocity of the satellite and a distance between the user terminal and the satellite, and wherein the uplink transmission delay is determined based at least partly on the downlink propagation delay and the uplink propagation delay.

* * * * *

UNITED STATES PATENT AND TRADEMARK OFFICE
CERTIFICATE OF CORRECTION

PATENT NO. : 11,985,611 B1
APPLICATION NO. : 17/339890
DATED : May 14, 2024
INVENTOR(S) : Peter J. Worters, Martin S. McCormick and Matthew J. Monson Page 1 of 1

It is certified that error appears in the above-identified patent and that said Letters Patent is hereby corrected as shown below:

In the Claims

In Claim 12, Column 29, Line 52, remove - and - between "target time or" and "a distance".

Signed and Sealed this
Twenty-fourth Day of September, 2024

Katherine Kelly Vidal
*Director of the United States Patent and Trademark Office*